(12) United States Patent
Amiruddin et al.

(10) Patent No.: US 11,476,494 B2
(45) Date of Patent: Oct. 18, 2022

(54) LITHIUM ION BATTERIES WITH HIGH CAPACITY ANODE ACTIVE MATERIAL AND GOOD CYCLING FOR CONSUMER ELECTRONICS

(71) Applicant: Envia Systems, Inc., Newark, CA (US)

(72) Inventors: Shabab Amiruddin, Menlo Park, CA (US); Bing Li, Union City, CA (US); Swapnil J. Dalavi, Newark, CA (US); Sujeet Kumar, Newark, CA (US)

(73) Assignee: Zenlabs Energy, Inc., Fremont, CA (US)

( * ) Notice: Subject to any disclaimer, the term of this patent is extended or adjusted under 35 U.S.C. 154(b) by 1211 days.

(21) Appl. No.: 14/460,482

(22) Filed: Aug. 15, 2014

(65) Prior Publication Data
US 2015/0050535 A1   Feb. 19, 2015

Related U.S. Application Data

(60) Provisional application No. 61/866,721, filed on Aug. 16, 2013.

(51) Int. Cl.
*H01M 10/0525* (2010.01)
*H01M 10/0567* (2010.01)
(Continued)

(52) U.S. Cl.
CPC ....... *H01M 10/0525* (2013.01); *H01M 4/131* (2013.01); *H01M 4/133* (2013.01); *H01M 4/364* (2013.01); *H01M 4/485* (2013.01); *H01M 4/525* (2013.01); *H01M 4/587* (2013.01); *H01M 10/058* (2013.01); *H01M 10/0567* (2013.01); *H01M 4/622* (2013.01); *H01M 6/5005* (2013.01); *H01M 2004/021* (2013.01); *H01M 2004/027* (2013.01); *H01M 2004/028* (2013.01); *H01M 2220/20* (2013.01); *H01M 2300/0025* (2013.01); *Y02E 60/10* (2013.01)

(58) Field of Classification Search
CPC .................................................. H01M 10/0525
See application file for complete search history.

(56) References Cited

U.S. PATENT DOCUMENTS

| 4,086,404 A | 11/1978 | Vissers et al. |
| 4,945,014 A | 7/1990 | Miyabayashi et al. |

(Continued)

FOREIGN PATENT DOCUMENTS

| EP | 2079120 A1 | 7/2009 |
| EP | 2141759 A1 | 1/2010 |

(Continued)

OTHER PUBLICATIONS

Miyachi et al., "Electrochemical Properties and Chemical Structures of Metal-Doped SiO Anodes for Li-Ion Rechargeable Batteries," J. Electrochem. Soc. 154(4):A376-A380 (2007).

(Continued)

*Primary Examiner* — Nathanael T Zemui
(74) *Attorney, Agent, or Firm* — Christensen, Fonder, Dardi; Elizabeth A. Gallo; Peter S. Dardi

(57) ABSTRACT

Battery designs are provided that exhibit commercially suitable cycling properties for consumer electronics with silicon based active materials in the electrodes. The batteries can have stacked or wound electrodes and suitable electrode designs.

18 Claims, 9 Drawing Sheets

(51) Int. Cl.
*H01M 4/525* (2010.01)
*H01M 4/131* (2010.01)
*H01M 4/485* (2010.01)
*H01M 10/058* (2010.01)
*H01M 4/36* (2006.01)
*H01M 4/133* (2010.01)
*H01M 4/587* (2010.01)
*H01M 4/62* (2006.01)
*H01M 4/02* (2006.01)
*H01M 6/50* (2006.01)

(56) References Cited

U.S. PATENT DOCUMENTS

| | | |
|---|---|---|
| 5,147,739 A | 9/1992 | Beard |
| 5,162,176 A | 11/1992 | Herr et al. |
| 5,395,711 A | 3/1995 | Tahara et al. |
| 5,436,093 A | 7/1995 | Huang et al. |
| 5,443,601 A | 8/1995 | Doeff et al. |
| 5,514,488 A | 5/1996 | Hake et al. |
| 5,541,022 A | 7/1996 | Mizumoto et al. |
| 5,595,837 A | 1/1997 | Olsen et al. |
| 5,721,067 A | 2/1998 | Jacobs et al. |
| 5,743,921 A | 4/1998 | Nazri et al. |
| 5,753,388 A | 5/1998 | Koksbang et al. |
| 5,792,577 A | 8/1998 | Ejiri et al. |
| 5,948,569 A | 9/1999 | Moses et al. |
| 6,025,093 A | 2/2000 | Herr |
| 6,080,507 A | 6/2000 | Yu |
| 6,083,644 A | 7/2000 | Watanabe et al. |
| 6,171,723 B1 | 1/2001 | Loch et al. |
| 6,235,427 B1 | 5/2001 | Idota et al. |
| 6,251,822 B1 | 6/2001 | Peng et al. |
| 6,335,115 B1 | 1/2002 | Meissner |
| 6,337,156 B1 | 1/2002 | Narang et al. |
| 6,383,687 B1 | 5/2002 | Gibbons et al. |
| 6,420,071 B1 | 7/2002 | Lee et al. |
| 6,511,767 B1 | 1/2003 | Calver et al. |
| 6,528,208 B1 | 3/2003 | Thackeray et al. |
| 6,616,715 B2 | 9/2003 | Kitoh et al. |
| 6,638,662 B2 | 10/2003 | Kaneda et al. |
| 6,645,671 B2 | 11/2003 | Tsutsumi et al. |
| 6,677,082 B2 | 1/2004 | Thackeray et al. |
| 6,680,143 B2 | 1/2004 | Thackeray et al. |
| 6,682,849 B2 | 1/2004 | Narang et al. |
| 6,699,336 B2 | 3/2004 | Turner et al. |
| 6,703,163 B2 | 3/2004 | Ogura et al. |
| 6,706,447 B2 | 3/2004 | Gao et al. |
| 6,730,429 B2 | 5/2004 | Thackeray et al. |
| 6,737,191 B2 | 5/2004 | Gan et al. |
| 6,749,648 B1 | 6/2004 | Kumar et al. |
| 6,759,160 B2 | 7/2004 | Fukuoka et al. |
| 6,783,896 B2 | 8/2004 | Tsujioka et al. |
| 6,787,267 B2 | 9/2004 | Tsujioka et al. |
| 6,787,268 B2 | 9/2004 | Koike et al. |
| 6,835,214 B2 | 12/2004 | Kitano et al. |
| 6,855,460 B2 | 2/2005 | Vaughey et al. |
| 6,858,349 B1 | 2/2005 | Luo et al. |
| 6,884,546 B1 | 4/2005 | Fujita et al. |
| 6,893,621 B2 | 5/2005 | Fukuoka et al. |
| 6,899,970 B1 | 5/2005 | Rogers et al. |
| 6,936,382 B2 | 8/2005 | Mikhaylik et al. |
| 6,951,699 B2 | 10/2005 | Yata et al. |
| 6,964,828 B2 | 11/2005 | Lu et al. |
| 6,979,513 B2 | 12/2005 | Kelley et al. |
| 7,008,722 B2 | 3/2006 | Huang |
| 7,026,074 B2 | 4/2006 | Chen et al. |
| 7,033,702 B2 | 4/2006 | Dasgupta et al. |
| 7,037,581 B2 | 5/2006 | Aramata et al. |
| 7,078,128 B2 | 7/2006 | Lu et al. |
| 7,135,252 B2 | 11/2006 | Thackeray et al. |
| 7,166,385 B2 | 1/2007 | Ishida et al. |
| 7,186,479 B2 | 3/2007 | Krasnov et al. |
| 7,195,842 B1 | 3/2007 | Fujimoto et al. |
| 7,198,869 B2 | 4/2007 | Ghantous et al. |
| 7,201,994 B2 | 4/2007 | Watanabe et al. |
| 7,201,997 B2 | 4/2007 | Ishida et al. |
| 7,205,072 B2 | 4/2007 | Kang et al. |
| 7,214,446 B1 | 5/2007 | Bi et al. |
| 7,229,717 B2 | 6/2007 | Yamaguchi et al. |
| 7,235,330 B1 | 6/2007 | Fujimoto et al. |
| 7,252,689 B2 | 8/2007 | Fujino et al. |
| 7,252,907 B2 | 8/2007 | Takeuchi et al. |
| 7,273,682 B2 | 9/2007 | Park et al. |
| 7,276,314 B2 | 10/2007 | Gao et al. |
| 7,297,446 B2 | 11/2007 | Fukui et al. |
| 7,338,734 B2 | 3/2008 | Chiang et al. |
| 7,351,494 B2 | 4/2008 | Hennige et al. |
| 7,416,813 B2 | 8/2008 | Fujihara et al. |
| 7,432,015 B2 | 10/2008 | Jeong et al. |
| 7,435,402 B2 | 10/2008 | Kang et al. |
| 7,452,631 B2 | 11/2008 | Kitao et al. |
| 7,452,632 B2 | 11/2008 | Lee et al. |
| 7,465,519 B2 | 12/2008 | Tang et al. |
| 7,497,285 B1 | 3/2009 | Radev |
| 7,507,503 B2 | 3/2009 | Amine et al. |
| 7,510,803 B2 | 3/2009 | Adachi et al. |
| 7,514,369 B2 | 4/2009 | Li et al. |
| 7,517,614 B2 | 4/2009 | Jeong et al. |
| 7,544,443 B2 | 6/2009 | Fujihara et al. |
| 7,563,541 B2 | 7/2009 | Howard et al. |
| 7,575,830 B2 | 8/2009 | Kawamura |
| 7,582,387 B2 | 9/2009 | Howard et al. |
| 7,588,623 B2 | 9/2009 | Dover et al. |
| 7,615,314 B2 | 11/2009 | Kawakami et al. |
| 7,658,863 B2 | 2/2010 | Aramata et al. |
| 7,700,221 B2 | 4/2010 | Yeo |
| 7,718,306 B2 | 5/2010 | Cheon et al. |
| 7,754,389 B2 | 7/2010 | Yamaguchi et al. |
| 7,776,473 B2 | 8/2010 | Aramata et al. |
| 7,790,316 B2 | 9/2010 | Aramata et al. |
| 7,833,662 B2 | 11/2010 | Kim et al. |
| 7,851,085 B2 | 12/2010 | Obrovac et al. |
| 7,871,727 B2 | 1/2011 | Obrovac et al. |
| 7,923,150 B2 | 4/2011 | Yamamoto et al. |
| 8,187,752 B2 | 5/2012 | Buckley et al. |
| 8,277,969 B2 | 10/2012 | Kobayashi et al. |
| 8,277,974 B2 | 10/2012 | Kumar et al. |
| 8,389,160 B2 | 3/2013 | Venkatachalam et al. |
| 8,465,873 B2 | 6/2013 | Lopez et al. |
| 8,535,832 B2 | 9/2013 | Karthikeyan et al. |
| 8,663,849 B2 | 3/2014 | Venkatachalam et al. |
| 8,765,306 B2 | 7/2014 | Amiruddin et al. |
| 9,159,990 B2 | 10/2015 | Amiruddin et al. |
| 9,552,901 B2 | 1/2017 | Amiruddin et al. |
| 9,601,228 B2 | 3/2017 | Deng et al. |
| 9,780,358 B2 | 10/2017 | Masarapu et al. |
| 2001/0031396 A1 | 10/2001 | Tsutsumi et al. |
| 2002/0102462 A1 | 8/2002 | Huggins et al. |
| 2002/0122973 A1 | 9/2002 | Manev et al. |
| 2002/0164479 A1 | 11/2002 | Matsubara et al. |
| 2003/0077515 A1 | 4/2003 | Chen et al. |
| 2003/0087155 A1 | 5/2003 | Cho et al. |
| 2003/0099883 A1 | 5/2003 | Ochoa et al. |
| 2003/0135989 A1 | 7/2003 | Huggins et al. |
| 2003/0157014 A1 | 8/2003 | Wang et al. |
| 2003/0157407 A1 | 8/2003 | Kosuzu et al. |
| 2003/0211390 A1 | 11/2003 | Dahn et al. |
| 2004/0023117 A1 | 2/2004 | Imachi et al. |
| 2004/0033419 A1 | 2/2004 | Funabiki |
| 2004/0048152 A1 | 3/2004 | Yata et al. |
| 2004/0072072 A1 | 4/2004 | Suzuki et al. |
| 2004/0076885 A1 | 4/2004 | Sato et al. |
| 2004/0146734 A1 | 7/2004 | Miller et al. |
| 2004/0151951 A1 | 8/2004 | Hyung et al. |
| 2004/0161669 A1 | 8/2004 | Zolonik et al. |
| 2004/0191630 A1 | 9/2004 | Kawamura et al. |
| 2004/0214085 A1 | 10/2004 | Sheem et al. |
| 2004/0241548 A1 | 12/2004 | Nakamoto et al. |
| 2005/0019670 A1 | 1/2005 | Amine et al. |
| 2005/0026037 A1 | 2/2005 | Riley, Jr. et al. |
| 2005/0026040 A1 | 2/2005 | Thackeray et al. |
| 2005/0031942 A1 | 2/2005 | Hennige et al. |
| 2005/0031963 A1 | 2/2005 | Im et al. |

(56) References Cited

U.S. PATENT DOCUMENTS

| | | |
|---|---|---|
| 2005/0130043 A1 | 6/2005 | Gao et al. |
| 2005/0175901 A1 | 8/2005 | Kawakami et al. |
| 2005/0202316 A1 | 9/2005 | Hwang et al. |
| 2005/0214644 A1 | 9/2005 | Aramata et al. |
| 2005/0233213 A1 | 10/2005 | Lee et al. |
| 2006/0003227 A1 | 1/2006 | Aramata et al. |
| 2006/0040182 A1 | 2/2006 | Kawakami et al. |
| 2006/0051671 A1 | 3/2006 | Thackeray et al. |
| 2006/0051673 A1 | 3/2006 | Johnson et al. |
| 2006/0051677 A1 | 3/2006 | Matsushima et al. |
| 2006/0068285 A1 | 3/2006 | Yamaguchi et al. |
| 2006/0078797 A1 | 4/2006 | Munshi |
| 2006/0099472 A1 | 5/2006 | Hsu |
| 2006/0115734 A1 | 6/2006 | Ishihara et al. |
| 2006/0147809 A1 | 7/2006 | Amine et al. |
| 2006/0188784 A1 | 8/2006 | Sudoh et al. |
| 2006/0197496 A1 | 9/2006 | Iijima et al. |
| 2006/0269834 A1 | 11/2006 | West et al. |
| 2006/0286438 A1 | 12/2006 | Fujikawa et al. |
| 2007/0003836 A1 | 1/2007 | Suzuki et al. |
| 2007/0048612 A1 | 3/2007 | Nakajima et al. |
| 2007/0059601 A1 | 3/2007 | Natsume et al. |
| 2007/0099436 A1 | 5/2007 | Kogetsu et al. |
| 2007/0148544 A1 | 6/2007 | Le |
| 2007/0190413 A1 | 8/2007 | Lee et al. |
| 2007/0207381 A1 | 9/2007 | Ohtsuka et al. |
| 2007/0224508 A1 | 9/2007 | Aramata et al. |
| 2007/0254102 A1 | 11/2007 | Fukuoka et al. |
| 2007/0259113 A1 | 11/2007 | Kizaki et al. |
| 2008/0008933 A1 | 1/2008 | Lampe-Onnerud |
| 2008/0026297 A1 | 1/2008 | Chen et al. |
| 2008/0095930 A1 | 4/2008 | Natsume et al. |
| 2008/0113269 A1 | 5/2008 | Yamamoto et al. |
| 2008/0131772 A1 | 6/2008 | Jambunathan et al. |
| 2008/0131783 A1 | 6/2008 | Choi et al. |
| 2008/0135801 A1 | 6/2008 | Kizaki et al. |
| 2008/0160265 A1 | 7/2008 | Hieslmair et al. |
| 2008/0193831 A1 | 8/2008 | Mah et al. |
| 2008/0213671 A1 | 9/2008 | Kogetsu et al. |
| 2008/0226988 A1 | 9/2008 | Minami et al. |
| 2008/0261115 A1 | 10/2008 | Saito et al. |
| 2008/0268347 A1 | 10/2008 | Ohzuku et al. |
| 2008/0274408 A1 | 11/2008 | Jarvis et al. |
| 2008/0318122 A1 | 12/2008 | Sun |
| 2009/0004564 A1 | 1/2009 | Ishida et al. |
| 2009/0023065 A1 | 1/2009 | Hwang et al. |
| 2009/0029256 A1 | 1/2009 | Mah et al. |
| 2009/0047577 A1 | 2/2009 | Iwamoto et al. |
| 2009/0053608 A1 | 2/2009 | Choi et al. |
| 2009/0092899 A1 | 4/2009 | Treger |
| 2009/0092900 A1 | 4/2009 | Obana et al. |
| 2009/0117466 A1 | 5/2009 | Zhamu et al. |
| 2009/0130562 A1 | 5/2009 | Mao et al. |
| 2009/0169994 A1 | 7/2009 | Mah et al. |
| 2009/0186267 A1 | 7/2009 | Tiegs |
| 2009/0214952 A1 | 8/2009 | Wakita et al. |
| 2009/0239151 A1 | 9/2009 | Nakanishi et al. |
| 2009/0253042 A1 | 10/2009 | Sun et al. |
| 2009/0263707 A1* | 10/2009 | Buckley .............. H01M 50/417 429/231.95 |
| 2009/0263721 A1 | 10/2009 | Haruna et al. |
| 2009/0297937 A1 | 12/2009 | Lampe-Onnerud et al. |
| 2009/0305131 A1 | 12/2009 | Kumar et al. |
| 2009/0317721 A1 | 12/2009 | Shirane et al. |
| 2009/0317722 A1 | 12/2009 | Watanabe |
| 2009/0325061 A1 | 12/2009 | Lim |
| 2010/0009261 A1 | 1/2010 | Watanabe |
| 2010/0047671 A1 | 2/2010 | Chiang et al. |
| 2010/0055563 A1 | 3/2010 | Nakanishi et al. |
| 2010/0086853 A1 | 4/2010 | Venkatachalam et al. |
| 2010/0086854 A1 | 4/2010 | Kumar et al. |
| 2010/0119939 A1 | 5/2010 | Misumi et al. |
| 2010/0119942 A1 | 5/2010 | Kumar et al. |
| 2010/0120179 A1 | 5/2010 | Zhamu et al. |
| 2010/0151332 A1 | 6/2010 | Lopez et al. |
| 2010/0159366 A1 | 6/2010 | Shao-Horn et al. |
| 2010/0173198 A1 | 7/2010 | Zhamu et al. |
| 2010/0178566 A1 | 7/2010 | Kogetsu et al. |
| 2010/0233543 A1 | 9/2010 | Numata et al. |
| 2010/0243951 A1 | 9/2010 | Watanabe et al. |
| 2010/0288970 A1 | 11/2010 | Watanabe et al. |
| 2010/0330430 A1 | 12/2010 | Chung et al. |
| 2011/0017528 A1 | 1/2011 | Kumar et al. |
| 2011/0037439 A1 | 2/2011 | Bhardwaj et al. |
| 2011/0052981 A1 | 3/2011 | Lopez et al. |
| 2011/0052989 A1 | 3/2011 | Venkatachalam et al. |
| 2011/0076556 A1 | 3/2011 | Karthikeyan et al. |
| 2011/0085960 A1 | 4/2011 | Mukasyan et al. |
| 2011/0111294 A1* | 5/2011 | Lopez .................. H01M 4/134 429/217 |
| 2011/0111298 A1 | 5/2011 | Lopez et al. |
| 2011/0111303 A1 | 5/2011 | Kung et al. |
| 2011/0111304 A1 | 5/2011 | Cui et al. |
| 2011/0136019 A1 | 6/2011 | Amiruddin et al. |
| 2011/0163274 A1 | 7/2011 | Plee et al. |
| 2011/0171529 A1 | 7/2011 | Kono et al. |
| 2011/0236751 A1 | 9/2011 | Amiruddin et al. |
| 2011/0244331 A1 | 10/2011 | Karthikeyan et al. |
| 2012/0028105 A1* | 2/2012 | Kumar .................. H01M 4/131 429/149 |
| 2012/0045670 A1 | 2/2012 | Stefan et al. |
| 2012/0056590 A1 | 3/2012 | Amiruddin et al. |
| 2012/0070725 A1 | 3/2012 | Venkatachalam et al. |
| 2012/0070741 A1 | 3/2012 | Liu et al. |
| 2012/0082877 A1 | 4/2012 | Song et al. |
| 2012/0105007 A1 | 5/2012 | Amiruddin et al. |
| 2012/0107680 A1 | 5/2012 | Amiruddin et al. |
| 2012/0121982 A1 | 5/2012 | Harimoto et al. |
| 2012/0264020 A1 | 10/2012 | Burton et al. |
| 2012/0295155 A1 | 11/2012 | Deng et al. |
| 2013/0078508 A1 | 3/2013 | Tolbert et al. |
| 2013/0095357 A1 | 4/2013 | Bhardwaj et al. |
| 2013/0122353 A1* | 5/2013 | Kawasaki ........... H01M 10/052 429/163 |
| 2013/0157147 A1 | 6/2013 | Li et al. |
| 2013/0189575 A1 | 7/2013 | Anguchamy et al. |
| 2013/0224585 A1* | 8/2013 | Oh ........................ H01M 4/505 429/211 |
| 2013/0295439 A1 | 11/2013 | Masarapu et al. |
| 2013/0302688 A1* | 11/2013 | Takezawa ............. H01M 4/131 429/223 |
| 2014/0065464 A1 | 3/2014 | Masarapu et al. |
| 2014/0308585 A1 | 10/2014 | Han et al. |
| 2014/0370387 A1 | 12/2014 | Anguchamy et al. |
| 2015/0050535 A1 | 2/2015 | Amiruddin et al. |
| 2016/0006021 A1 | 1/2016 | Lopez et al. |
| 2016/0079591 A1 | 3/2016 | Yang et al. |
| 2017/0194627 A1 | 7/2017 | Deng et al. |
| 2018/0062206 A1 | 3/2018 | Yang et al. |
| 2018/0241036 A1 | 8/2018 | Jo et al. |

FOREIGN PATENT DOCUMENTS

| | | |
|---|---|---|
| JP | 07-065825 | 3/1995 |
| JP | 09-045373 | 2/1997 |
| JP | 10-255837 | 9/1998 |
| JP | 2000-012018 | 1/2000 |
| JP | 2001-118568 | 4/2001 |
| JP | 2002-110167 | 4/2002 |
| JP | 2003-223887 | 8/2003 |
| JP | 2003-242978 A | 8/2003 |
| JP | 2005-251684 A | 9/2005 |
| JP | 2007-066667 A | 3/2007 |
| JP | 2009-252705 A | 10/2009 |
| JP | 2010-055775 | 3/2010 |
| KR | 10-2001-0043360 A | 5/2001 |
| KR | 10-2003-0007651 A | 1/2003 |
| KR | 10-2004-0096381 A | 11/2004 |
| KR | 10-0493960 B1 | 6/2005 |
| KR | 10-2006-0087003 A | 8/2006 |
| KR | 10-2006-0087183 A | 8/2006 |
| KR | 2012-0073603 A1 | 7/2012 |
| WO | 01-35473 A1 | 5/2001 |

(56) References Cited

FOREIGN PATENT DOCUMENTS

| WO | 01-91209 A1 | 11/2001 |
|---|---|---|
| WO | 2004-025757 A2 | 3/2004 |
| WO | 2004-084330 A2 | 9/2004 |
| WO | 2005-011030 A1 | 2/2005 |
| WO | 2005-031898 A1 | 4/2005 |
| WO | 2005-065082 A2 | 7/2005 |
| WO | 2005-076389 A2 | 8/2005 |
| WO | 2005-083829 A2 | 9/2005 |
| WO | 2006-109930 A1 | 10/2006 |
| WO | 2006-137673 A1 | 12/2006 |
| WO | 2007-126257 A1 | 11/2007 |
| WO | 2008-086041 A1 | 7/2008 |
| WO | 2009-022848 A1 | 2/2009 |
| WO | 2011-053736 A1 | 5/2011 |
| WO | 2013-082330 | 11/2012 |
| WO | 2018-051675 | 3/2018 |

OTHER PUBLICATIONS

Naoi et al., "Nonflammable Hydrofluoroether for Lithium-Ion Batteries: Enhanced Rate Capability, Cyclability, and Low-Temperature Performance," J. Electrochem. Soc. 156(4):A272-A276 (2009) (Abstract only).

Park et al., "Physical and electrochemical properties of spherical Li1+x(Ni1/3Co1/3Mn1/3)1-xO2 cathode materials," Journal of Power Sources, 177:177-183 (2008).

Profatilova et al., "Enhanced thermal properties of the solid electrolyte interphase formed on graphite in an electrolyte with fluoroethylene carbonate," Electrochimica Acta 54: 4445-4450 (2009).

Ruffo et al., "Impedance Analysis of Silicon Nanowire Lithium Ion Battery Anodes," J. Phys. Chem. C 113:11390-11398 (2009).

Schoenenberger et al., "Multiwall carbon nanotubes," http://physicsworld.com/cws/article/print/606 (printed Oct. 7, 2009).

Shi et al., "Nano-SnSb alloy deposited on MCMB as an anode material for lithium ion batteries," J. Materials Chemistry, 11(5):1502-1505 (2001).

Song et al., Two-and three-electrode impedance spectroscopy of lithium-ion batteries, Journal of Power Sources, 111:255-267 (2002).

Sun et al., "AIF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).

Sun et al., "Significant Improvement of high voltage cycling behavior AIF3-coated LiCoO2 cathode," Electrochemistry Communications 8:821-826 (2006).

Sun et al., "The preparation and electrochemical performance of solid solutions LiCoO2-Li2MnO3 as cathode materials for lithium ion batteries," Journal of Power Sources, 159:1353-1359 (2006).

Tabuchi et al., "Li-doping process for LixSiO-negative active material synthesized by chemical method for lithium ion cells," Journal of Power Sources 146:507-509 (2005).

Thackeray et al., "Comments on the structural complexity of lithium-rich Li1+xM1-xO2 electrodes (M=Mn,Ni,Co) for lithium batteries," Electrochemistry Communications 8:1531-1538 (2006).

Thackeray et al., "Li2MnO3-stabilized LiMO2 (M=Mn, Ni, Co) electrodes for lithium-ion batteries," J. Mater. Chem., 17:3112-3125 (2007).

Veluchamy et al., "Improvement of cycle behaviour of SiO/C anode compositie by thermochemically generated Li4SiO4 inert phase for lithium ion batteries," Journal of Power Sources 188:574-577 (2009).

Wang et al., "Lithium Insertion in Carbon-Silicon Composite Materials Produced by Mechanical Milling," J. Electrochem. Soc., 145(8): 2751-2758 (1998).

Wang et al., "Nano-sized SiOx-/C Composite Anode for Lithium Ion Batteries." Journal of Power Sources 196 (2011) 4811-4815 available Jan. 2011.

Woo et al., "Significant Improvement of Electrochemical Performance of AIF3-Coated Li[Ni0.8Co0.1Mn0.1]O2 Cathode Materials," J. of the Electrochemical Society, 154 (11) A1005-A1009 (2007).

Wu et al., "High Capacity, Surface-Modified Layered Li[Li(1−x)/3Mn(2−x)/3Nix/3Cox/3]O2 Cathodes with Low Irreversible Capacity Loss," Electrochemical and Solid State Letters, 9(5):A221-A224 (2006).

Yakovleva et al., "Stabilized Lithium Metal Powder, Enabling Material and Revolutionary Technology for High Energy Li-ion Batteries," 2010 DOE Vehicle Technologies Program Review (Presentation).

Yamaki et al., "Characterization and Thermal Stability of SEI between a Graphite Electrode and Methyl Difluoroacetate-based Electrolyte," Abstract #236 from the 210th Meeting of the Electrochemical Society (2006).

Yang et al., "SiOx-based anodes for secondary lithium batteries." Solid State Ionics 152-153 (2002) 125-129, available Mar. 2002.

Yang et al., "Nanosized silicon-based composite derived by in situ mechanochemical reduction for lithium ion batteries," Journal of Power Sources, 164, pp. 880-884 (2007).

Yoshio et al., "Electrochemical behaviors of silicon based anode material," Journal of Power Sources 146:10-14 (2005).

Timcal Graphite & Carbon, A Synopsis of Analytical Procedures, www.timcal.com (2008).

International Search Report and Written Opinion from corresponding PCT Application No. PCT/US2013/ 037900, dated Aug. 19, 2013 (16 pages).

Taiwan Office Action from corresponding Taiwan Patent Application No. 102115966, dated Jun. 20, 2014 (6 pages).

Veluchamy et al., "A new SiO/C Anode Composition for Lithium-ion Battery." Journal of Power Sources 179 (2008) 367-370, published Dec. 2007.

Achiha et al. , "Electrochemical Behavior of Nonflammable Organo-Fluorine Compunds for Lithium Ion Batteries," Journal of the Electrochemical Society 156(6): A483-A488 (2009).

"Battery Test Manual for Plug-in Hybrid Electric Vehicles," prepared for the U.S. Department of Energy, Office of Energy Efficiency and Renewable Energy, Vehicle Technologies Program (2008). (USDE_Manual_2008).

Chan et al., "High-performance lithium battery anodes using silicon nanowires," Nature Nanotechnology Jan. 2008, vol. 3, pp. 31-35.

Chen et al., "Electrochemical Insertion/extraction of Lithium in Multiwall Carbon Nanotube/Sb and SnSb0.5 Nanocomposites," published by the Massachusetts Institute of Technology, division of Molecular Engineering of Biological and Chemical Systems, Dec. 2003.

Chiang et al., "High Capacity, Temperature-Stable Lithium Aluminum Manganese Oxide Cathodes for Rechargeable Batteries," Electrochemical and Solid State Letters, 2(3):107-110 (1999).

Choi et al., "Effect of fluoroethylene carbonate additive on interfacial properties of silicon thin-film electrode" Journal of Power Sources 161 (2006) 1254-1259. (Abstract only).

Cui et al., "Carbon-silicon core-shell nanowires as high capacity electrode for lithium ion batteries," Nano Lett. 9(9):3370-3374 (2009).

Evonik Industries, "Scientific breakthrough: SEPARION® opens up new markets for lithium ion batteries," http://corporate.evonik.de/en/company/news/lithium_ion_batteries/Pages/separion.aspx (Oct. 7, 2009).

"For More Charge Use Li, For Maximum Charge, Use FMCs SLMP™ Technology," Product Brochure, FMC Corporation 2008 (1 page).

Guerfi et al., "SiOx-graphite as negative for high energy Li-ion batteries," Journal of Power Sources 196:5667-5673 (2011).

Ishikawa et al., "Li-ion Battery Performance with FSI-based Ionic Liquid Electrolyte and Fluorinated Solvent-based Electrolyte" ECS Trans. 33:29-36 (2010) (Abstract).

Ito et al., "A new approach to improve the high-voltage cyclic performance of Li-rich layered cathode material by electrochemical pre-treatment," Journal of Power Sources, 183:344-346 (2008).

(56) References Cited

OTHER PUBLICATIONS

Ito et al., "Cyclic deterioration and its improvement for Li-rich layered cathode material Li [Ni0.17Li0.2Co0.07Mn0.56]O2," Journal of Power Sources, 195:567-573 (2010).

Jeong et al., "A Nanostructured SiAl0.2O Anode Material for Lithium Batteries," Chem. Mater. 22:5570-5579 (2010).

Kang et al., "Enhancing the rate capability of high capacity xLi2MnO3 • (1–x)LiMO2 (M=Mn, Ni, Co) electrodes by Li—Ni—PO4 treatment," Electrochemistry Communications 11:748-751 (2009).

Kang et al., Layered Li(Li0.2Ni0.15+0.5zCo0.10Mn0.55-0.5z)O2-zFz cathode materials for Li-ion secondary batteries, Journal of Power Sources 146:654 657 (2005).

Kim et al., Improvement of High-Voltage Cycling Behavior of Surface Modified Li[Ni1/3Co1/3Mn1/3]O2 Cathodes by Fluorine Substitution for Li-Ion Batteries, Journal of the Electrochemical Society 152 (9) A1707-A1713 (2005).

Kim et al., "Synthesis of spherical Li[Ni(1/3–z)Co(1/3–z)Mn(1/3–z)Mgz]O2 as positive electrode material for lithium ion battery," Electrochimica Acta 51:2447-2453 (2006).

Lee et al., "High capacity Li[Li0.2Ni0.2Mn0.6]O2 cathode materials via a carbonate co-precipitation method," J. of Power Sources, 162:1346-1350 (2006).

Liu et al., "Electrical transport in doped multiwalled carbon nanotubes," Physical Review B, vol. 63,161404(R), pp. 1-4 (2001).

Liu et al., "Improvement of cycling stability of Si anode by mechanochemical reduction and carbon coatings." Journal of Power Sources, 189, pp. 480-484 (2009).

McMillan et al. "Fluoroethylene carbonate electrolyte and its use in lithium ion batteries with graphite anodes," Journal of Power Sources 81-2: 20-26 (1999) (Abstract).

Hu et al., "Superior Storage Performance of a Si@SiOx/C Nanocomposite as Anode Material for Lithium-Ion Batteries," Agnewandte Chemie International Edition, 2008, 47, 1645-1649, available Feb. 2008.

Li et al."Lithium polyacrylate as a binder for tin-cobalt-carbon negative electrodes in lithium-ion batteries," Electrochemica Acta, vol. 55 pp. 2991-2995, (2010).

Kim et al. , "Three-Dimensional Porous Silicon Particles for Use in High-Performance Lithium Secondary Batteries." Angew. Chem. Int. Ed. 2008, 47, 10151-10154, (Year 20108).

\* cited by examiner

LITHIUM ION BATTERIES WITH HIGH CAPACITY ANODE ACTIVE MATERIAL AND GOOD CYCLING FOR CONSUMER ELECTRONICS

CROSS REFERENCE TO RELATED APPLICATIONS

This application claims priority to U.S. provisional patent application Ser. No. 61/866,721 to Amiruddin et al. filed Aug. 16, 2013, entitled "Lithium Ion Batteries With High Capacity Anode Active Material for Consumer Electronics," incorporated herein by reference.

FIELD OF THE INVENTION

This patent application is directed to battery designs suitable for consumer electronics batteries that incorporate a high capacity anode material, especially a silicon based active material.

BACKGROUND OF THE INVENTION

Consumer electronics have achieved widespread use worldwide. With growing reliance on consumer electronic devices that are battery powered, consumers make use of rechargeable batteries to meet their power needs. For these uses, the batteries are desired to have a small physical footprint for a given energy capacity. Rechargeable batteries should provide appropriate output for a reasonable number of cycles for the batteries to find broad use for many consumer products in which consumers can demand a certain degree of performance.

SUMMARY OF THE INVENTION

In a first aspect, the invention pertains to a lithium ion battery having a volume from about 500 mm$^3$ to about 100,000 mm$^3$ and comprising a positive electrode comprising a lithium metal oxide, a negative electrode comprising a silicon based active material, a separator between the positive electrode and the negative electrode, supplemental lithium and an electrolyte comprising lithium ions. In some embodiments, the supplemental lithium is provided in an amount to compensate for about 100% to about 170% of the negative electrode first cycle irreversible capacity loss. Generally, the positive electrode can have a loading from about 10 mg/cm$^2$ to about 40 mg/cm$^2$ and a density of active material from about 2.5 g/cc to about 4.6 g/cc, and wherein the negative electrode has a loading from about 1.5 mg/cm$^2$ to about 8 mg/cm$^2$ and a density from about 0.5 g/cc to about 2.0 g/cc.

In further aspects, the invention pertains to a lithium ion battery having a volume from about 500 mm$^3$ to about 100,000 mm$^3$ and comprising a positive electrode comprising a lithium metal oxide, a negative electrode comprising a silicon based active material, a separator between the positive electrode and the negative electrode, supplemental lithium and an electrolyte comprising lithium ions. In some embodiments, the supplemental lithium is present in an amount to compensate for about 100% to about 170% of the negative electrode first cycle irreversible capacity loss. The silicon based active material generally can have a specific capacity from about 800 mAh/g to about 2500 mAh/g at a rate of C/3 when cycled from 1.5 V to 0.005 V against lithium, and the lithium ion battery can have a balance of negative electrode capacity relative to the sum of positive electrode capacity and supplemental lithium from about 0.8 to about 1.7. In some embodiments, the battery can exhibit a volumetric energy density at least about 500 Wh/l at a rate of C/10 discharged from 4.35 V to 2.75 V. Following usual specification in consumer electronics, the dimensions and volume of a pouch battery exclude the TAB region, and this specification is described further below in the context of the figures.

In additional aspects, the invention pertains to a lithium ion battery having a volume from about 500 mm$^3$ to about 100,000 mm$^3$ and comprising a positive electrode comprising a lithium metal oxide, a negative electrode comprising a silicon based active material, a separator between the positive electrode and the negative electrode, supplemental lithium and an electrolyte comprising lithium ions. In some embodiments, the supplemental lithium is present in an amount to compensate for about 100% to about 170% of the negative electrode first cycle irreversible capacity loss. The silicon based active material can have a specific capacity from about 800 mAh/g to about 2500 mAh/g at a rate of C/3 when cycled from 1.5 V to 0.005 V against lithium, and the lithium ion battery can have a balance of negative electrode capacity relative to the sum of positive electrode capacity and supplemental lithium from about 0.8 to about 1.7. In some embodiments, the lithium ion battery can have a 150th cycle discharge capacity at a discharge rate of C/3 discharged from 4.35 V to 2.75 V that is at least about 70% of the 5th cycle discharge capacity at a discharge rate of C/3 discharged from 4.35 V to 2.75 V.

In other aspects, the invention pertains to a lithium ion battery comprising a positive electrode comprising a lithium metal oxide, a negative electrode, a separator between the positive electrode and the negative electrode and an electrolyte comprising lithium ions. In some embodiments, the supplemental lithium can be in an amount to compensate for about 100% to about 170% of the negative electrode first cycle irreversible capacity loss. Furthermore, the negative electrode can comprise a silicon based active material and a graphitic carbon active material with graphitic carbon being about 5 wt % to about 45 wt % of the active material of the negative electrode.

DETAILED DESCRIPTION OF THE INVENTION

Figure 1B:
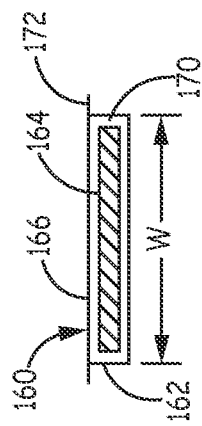
FIG. 1(b) is a perspective lower face view of the assembled pouch battery of FIG. 1(a).

Desirable lithium ion batteries have been engineered for particular application to consumer electronics application based on advances in electrode design and cell cycling stabilization. To obtain improved performance parameters, the negative electrode, i.e., anode, can comprise a high capacity active material, e.g., a silicon based material. To provide for reasonable cycling of the negative electrode, it has been discovered how to design the electrode to provide for significant morphological changes to the material during cycling without degrading the material. Furthermore, supplemental lithium can be included in the batteries to account for at least a portion of first cycle irreversible capacity losses that can be large for high capacity negative electrode active materials. Through appropriate design, the improved electrodes can be introduced into batteries with appropriate cycling for commercial application, for example, for consumer electronics. In some embodiments, a significant amount of active graphitic carbon can be combined with a silicon based active material in the negative electrode to achieve improved cycling along with a modest decrease in capacity.

For consumer electronics, volume based parameters are of interest due to size constraints of the corresponding devices, and weight is a consideration within the context of achievement of desired volume performance. Various shape considerations can be accommodated generally, although certain applications may suggest a preference for generally prismatic shapes or generally cylindrical shapes in preference over the other. Of course, relative small battery sizes are generally applicable for consumer electronics applications, and the design considerations are generally based on battery volumes of about 1000 mm$^3$ to about 100,000 mm$^3$ or in further embodiments from about 2000 mm$^3$ to about 50,000 mm$^3$. While the batteries are designed with consumer electronics focus, the batteries can be used for other purposes, and vehicles, and other non-consumer electronics devices can incorporate consumer electronics batteries if desired. Battery designs based on high capacity anode materials and high capacity cathode materials with larger battery formats for vehicle use are described further in published U.S. patent application 2014/0065464 to Masarapu et al., entitled "Battery Designs With High Capacity Anode Materials and Cathode Materials," incorporated herein by reference.

The active materials for the battery generally include, for example, a positive electrode (i.e., cathode) active material with a moderately high average voltage against lithium and a silicon based active material for the negative electrode (i.e., anode), which generally can alloy with lithium to incorporate and release lithium from the material during cycling. In general, various cathode materials can be used. Recently developed materials with a high specific capacity, which have a layered crystal structure and are lithium rich relative to a $LiMO_2$ (M=non-lithium metal) reference composition, are described, for example, in U.S. Pat. No. 8,389,160 to Venkatachalam et al., entitled "Positive Electrode Materials For Lithium Ion Batteries Having a High Specific Discharge Capacity And Processes for the Synthesis of These Materials," and U.S. Pat. No. 8,465,873 to Lopez et al, entitled "Positive Electrode Materials for High Discharge Capacity Lithium Ion Batteries," both of which are incorporated herein by reference. However, other commercially available cathode active materials can accommodate high electrode loading densities that are desirable to obtain desirable volume based performance parameters also with existing commercial production availability to allow for rapid market penetration. Such materials of interest include, for example, lithium cobalt oxide ($LiCoO_2$), $LiCo_{1/3}Ni_{1/3}Mn_{1/3}O_2$ (L333) and $LiMn_2O_4$ (lithium manganese oxide spinel). Lithium cobalt oxide is of interest in part due to the capability of having very high loadings of active material in the positive electrode while still achieving stable cycling suitable for a consumer electronics battery. Results are presented herein based on the incorporation of lithium cobalt oxide.

The positive electrode active materials can have a stabilization coating. Stabilization nanocoatings for positive electrode active materials are described further in published U.S. patent application 2011/0111298 to Lopez et al., entitled "Coated Positive Electrode Materials for Lithium Ion Batteries," U.S. Pat. No. 8,535,832 to Karthikeyan et al., entitled "Metal Oxide Coated Positive Electrode Materials for Lithium-Based Batteries," and U.S. Pat. No. 8,663,849 to Venkatachalam et al., entitled "Metal Halide Coatings on Lithium Ion Battery Positive Electrode Materials and Corresponding Batteries," all three of which are incorporated herein by reference.

Silicon based anode materials have attracted a lot of attention as a negative electrode active material due to the intrinsic extremely high specific capacity of silicon with respect to alloying with lithium. However, silicon undergoes large volume changes in association with lithium alloying and lithium release, which provides challenges with respect to obtaining suitable cycling for commercial applications. For consumer electronic applications, a reasonable cycling target can be roughly 300-500 cycles without an unacceptable loss of performance. As described herein suitable battery designs have been developed for consumer electronics applications that can achieve appropriate performance for consumer electronic applications using silicon based anodes. A commercial silicon based material comprising SiO is available from Shin-Etsu, Japan (www.shin-etsu.co.jp). Additional specific suitable formulations of the silicon based compositions are described further below. In some embodiments, it is desirable to have negative electrodes comprising a combination of graphitic carbon active material and silicon based active material to extend cycling life with a modest decrease in capacity.

To achieve the desired cycling, several improvements in design are combined to provide suitable performance, and the specific features provide surprising synergistic performance improvements in combination. In particular, the negative electrodes can be designed with a binder having a high tensile strength and elongation capability. Carbon nanotubes as an electrically conductive electrode additive have been found to surprisingly improve cycling of the negative electrodes with the silicon based active material, although other highly conductive carbon nanoscale materials, such as carbon black, carbon nanofibers, or combinations thereof, or combinations with carbon nanotubes can also be effectively used. Electrolytes can be provided with excellent cycling at higher voltages>4.3 V. These features can be combined with a design of electrode loading and density that provides good volume based performance for the resulting consumer electronics battery designs. The cycling can be further improved with the addition of supplemental lithium into the battery and/or with an adjustment of the balance of the active materials in the respective electrodes.

In a lithium ion battery, reactive lithium for cycling is generally provided in the positive electrode active material, which is transferred to the negative electrode during the initial charge of the battery where it is then available for discharge of the battery. The silicon based negative electrodes generally exhibit a large irreversible capacity loss during the first charge of the battery. The loss of capacity can generally be associated with corresponding irreversible changes to the materials during the initial charge of the battery. For example, a solid electrolyte interphase (SEI) layer forms in association with the negative electrode active material as a result of reactions with typical electrolytes used in the batteries. The SEI layer can stabilize the battery during cycling if a stable SEI layer is formed. Presumably other irreversible changes take place with respect to the silicon based active composition, although these changes may not be fully understood. The first cycle irreversible capacity loss is generally significantly larger than any per cycle loss of capacity associated with subsequent cycling of the battery, although the second, third and a few additional cycles may still have greater per cycle capacity loss due to a carry over of initial changes into the first few cycles rather than being fully accomplished in the first cycle. A relatively large irreversible capacity loss (IRCL) can decrease the cycling capacity as well as the energy output and power output of the battery during cycling.

To reduce the loss of energy output and power output of the cell as a result of the irreversible capacity loss, supplemental lithium can be included to provide additional lithium into the cell. The introduction of supplemental lithium can reduce the introduction of cathode active material that does not cycle due to loss of active lithium capacity associated with the IRCL. Supplemental lithium refers to active lithium that is introduced directly or indirectly into the battery to replace lithium lost to irreversible processes. Various approaches for the introduction of supplemental lithium can be used including, for example, addition of a lithium active material (e.g. lithium metal power or foil) to the negative electrode, addition of a sacrificial lithium source to the positive electrode, inclusion of a sacrificial lithium electrode to the battery structure, electrochemical pre-lithiation of the negative electrode, or the like. These approaches are described further in published U.S. patent application 2012/0107680 to Amiruddin et al., entitled "Lithium Ion Batteries With Supplemental Lithium," and published U.S. patent application 2011/0111294 to Lopez et al., entitled "High Capacity Anode Materials for Lithium Ion Batteries," both of which are incorporated herein by reference. With respect to commercialization, it has been found that an electrochemical approach can be convenient, such as the approach described in published PCT application, WO 2013/082330 to Grant et al., entitled "Method for Alkaliating Anodes," incorporated herein by reference. The supplemental lithium can be introduced in a quantity to compensate for a portion of the irreversible capacity loss, approximately all of the irreversible capacity loss, or a greater amount than the irreversible capacity loss, but generally no more than 20% of the capacity of the negative electrode active material above the irreversible capacity loss. In some embodiments the supplemental lithium can compensate for from about 90% to about 170% of the anode first cycle irreversible capacity loss.

The anode design generally involves a balance of factors to achieve target volumetric energy densities and power densities while still providing for reasonable cycling. As seen in results in the Examples presented in the attached appendix, the batteries with silicon based anode active materials have been able to cycle for several hundreds of cycles. At the same time, the realistic negative electrode design can be matched up with reasonable positive electrode designs to achieve good cycling as well as good values of volumetric based performance. Electrode designs are described in detail below.

As noted above, the battery designs described herein can be adapted for cylindrical batteries or more rectangular or prismatic style batteries. Cylindrical batteries generally have wound electrode structures while prismatic shaped batteries can have either wound or stacked electrodes. In general, to achieve desired performance capacities with appropriate electrode design with respect to electrode loadings and densities, the battery can comprise a plurality of electrodes of each polarity that can be stacked with separator material between electrodes of a cell. Winding of the electrodes can provide a similar effect with a reasonable internal resistance clue to electron conductivities and ion mobilities as well as good packing of the electrodes within an appropriate container. Wound cells for cylindrical lithium ion batteries are described further in U.S. Pat. No. 8,277,969 to Kobayashi et al., entitled "Lithium Ion Secondary Battery," incorporated herein by reference. Prismatic shaped batteries with wound electrodes are described in U.S. Pat. No. 7,700,221 to Yeo (the '221 patent), entitled "Electrode Assembly and Lithium Ion Secondary Battery Using the Same," incorporated herein by reference. The Kobayashi '969 patent and the Yeo '221 patent do not describe how to achieve reasonable cycling or a high volumetric energy density with silicon based active materials.

The size of the batteries generally affects the total capacity and energy output of the battery. The designs described herein are based on obtaining desirably high volumetric energy density while providing desirable cycling of the battery based on a silicon based active material. The batteries can have a room temperature volumetric energy density of at least about 500 Wh/l (Watt hours per liter), in further embodiments at least about 525 Wh/l, and in other embodiments from about 550 Wh/l to about 725 Wh/l when cycled from 4.35 V to 2.75 V at C/10 rate, i.e. approximately discharging the battery in 10 hours. Correspondingly, the battery can exhibit at least about 150 cycles at room temperature with charge/discharge rates of C/3 (discharge of the battery in about 3 hours) without a drop of more than 20% of the initial capacity at a C/3 rate. It is anticipated that improved control of battery fabrication conditions based on the teachings herein can accomplish a cycling to at least 300 cycles and in some embodiments 400 cycles or more without a drop of 20% of initial capacity. A person of ordinary skill in the art will recognize that additional ranges of volumetric energy density and cycling within the explicit ranges above are contemplated and are within the present disclosure. The first cycle of the battery can be referred to as the formation cycle in reference to irreversible changes that generally take place in this cycle. The formation cycle generally can be performed under controlled conditions at relatively slow charge rates and possibly discharge rates. It has been found under some conditions it is desirable to use multiple step formation cycles as described in U.S. Pat. No. 8,765,306 to Amiruddin et al., entitled "High Voltage Battery Formation Protocols and Control of Charging and Discharging for Desirable Long Term Cycling Performance," incorporated herein by reference. Similarly, a multistep charging process has been proposed for each charge step to increase battery lifetimes, as described in published U.S. patent application 2011/0037439 to Bhardwaj et al., entitled "Increasing Energy Density in Rechargeable Lithium Battery Cells," incorporated herein by reference. Performance values are at room temperature, 22° C.-25° C., unless indicated otherwise.

Battery Structure

Batteries generally comprise a negative electrode, a positive electrode and a separator between the negative electrode and the positive electrode. A battery can comprise multiple positive electrodes and multiple negative electrodes, such as in a stack, with appropriately placed separators. Electrolyte, such as the desirable electrolytes described herein, in contact with the electrodes provides ionic conductivity through the separator between electrodes of opposite polarity. A battery generally comprises current collectors associated respectively with negative electrode and positive electrode. The stack of electrodes with their associated current collectors and separator are generally placed within a container with the electrolyte. In general, the lithium ion battery described herein comprises a positive electrode comprising a lithium intercalation material and a negative electrode comprising a silicon based lithium alloying material. The nature of the positive electrode active material and the negative electrode active material influences the resulting voltage of the battery since the voltage is the difference between the half cell potentials at the cathode and anode. The balance of the negative electrode capacity and positive electrode capacity can be selected to improve the cycling performance of the battery appropriately accounting for any supplemental lithium as described further below. In general, the negative electrode capacity can be set to be from about 20% to about 100% greater than the positive electrode capacity.

The positive electrode active compositions and negative electrode active compositions generally are powder compositions that are held together in the respective electrode with a polymer binder. The binder provides ionic conductivity to the active particles when in contact with the electrolyte. Suitable polymer binders include, for example, polyvinylidine fluoride (PVDF), polyethylene oxide, polyimide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. High molecular weight (e.g., at least about 800,000 AMU) PVDF can be a desirable polymer binder for the positive electrodes.

For silicon-based anodes that exhibit significant morphological changes during cycling, thermally curable polyimide polymers have been found desirable for high capacity negative electrodes, which may be due to their high mechanical strength. The following table provides suppliers of polyimide polymers, and names of corresponding polyimide polymers.

| Supplier | Binder |
|---|---|
| New Japan Chemical Co., Ltd. | Rikacoat PN-20; Rikacoat EN-20; Rikacoat SN-20 |
| HD MicroSystems | PI-2525; PI-2555; PI-2556; PI-2574 |
| AZ Electronic Materials | PBI MRS0810H |
| Ube Industries. Ltd. | U-Varnish S; U-Varnish A |
| Maruzen petrochemical Co., Ltd. | Bani-X (Bis-allyl-nadi-imide) |
| Toyobo Co., Ltd. | Vyromax HR16NN |

With respect to polymer properties, some significant properties for high capacity negative electrode application are summarized in the following table.

| Binder | Elongation | Tensile Strength (MPa) | Elastic Modulus | Viscosity (P) |
|---|---|---|---|---|
| PVDF | 5-20% | 31-43 | 160000 psi | 10-40 |
| Polyimide | 70-100% | 150-300 | | 40-60 |
| CMC | 30-40% | 10-15 | | 30 |

PVDF refers to polyvinylidene fluoride, and CMC refers to sodium carboxy methyl cellulose. The elongation refers to the percent elongation prior to tearing of the polymer. In general, to accommodate the silicon based materials, it is desirable to have an elongation of at least about 50% and in further embodiments at least about 70%. Similarly, it is desirable for the polymer binder to have a tensile strength of at least about 50 MPa and in further embodiments at least about 100 MPa. Tensile strengths can be measured according to procedures in ASTM D638-10 Standard Test Method for Tensile Properties of Plastics, incorporated herein by reference. A person of ordinary skill in the art will recognize that additional ranges of polymer properties within the explicit ranges above are contemplated and are within the present disclosure. To form the electrode, the powders can be blended with the polymer in a suitable liquid, such as a solvent for the polymer. The resulting paste can be pressed into the electrode structure.

High Capacity Anode Materials

In general, the battery designs herein are based on a high capacity anode active material. Specifically, the anode active materials generally have a specific capacity of at least about 700 mAh/g, in further embodiments at least about 800 mAh/g, in additional embodiments at least about 900 mAh/g, in some embodiments at least about 1350 mAh/g and in other embodiments at least about 1500 mAh/g when cycled at a rate of C/10 against lithium metal from 0.005 V to 1.5 V. As this implies, the specific capacity of negative electrode active material can be evaluated in a cell with a lithium metal counter electrode. However, in the batteries described herein, the negative electrodes can exhibit comparable specific capacities when cycled against high capacity lithium metal oxide positive electrode active materials. In the battery with non-lithium metal electrodes, the specific capacity of the respective electrodes can be evaluated by dividing the battery capacity by the respective weights of the active materials. As described herein, desirable cycling results can be obtained with a combination of a silicon based active material and a graphitic carbon active material with good capacities observed.

Formulations of silicon based negative electrode active materials have been developed with high capacity and reasonable cycling properties. These compositions provide potential and promising alternatives, for example, to commercially available SiO compositions. Elemental silicon has attracted significant amount of attention as a potential negative electrode material due to its very high specific capacity with respect to intake and release of lithium. Silicon forms an alloy with lithium, which can theoretically have a lithium content corresponding with more than 4 lithium atoms per silicon atom (e.g., $Li_{4.4}Si$). Thus, the theoretical specific capacity of silicon is on the order of 4000-4400 mAh/g, which is significantly larger than the theoretical capacity of about 370 mAh/g for graphite. Graphite is believed to intercalate lithium to a level of roughly 1 lithium atom for 6 carbon atoms ($LiC_6$). Also, elemental silicon, silicon alloys, silicon composites and the like can have a low potential relative to lithium metal similar to graphite. However, silicon undergoes a very large volume change upon alloying with lithium. A large volume expansion on the order of two to four times of the original volume or greater has been observed, and the large volume changes have been correlated with a significant decrease in the cycling stability of batteries having silicon-based negative electrodes.

Germanium has a similar chemistry to silicon, and germanium and germanium oxide can be used to alloy/intercalate lithium similarly to silicon and silicon oxide as described below. Thus, germanium based active anode materials can be substituted for silicon based materials described herein, and generally similar composites, alloys and mixtures thereof can be formed with germanium as are described for silicon. Germanium has a theoretical specific capacity of 1623 mAh/g compared to the silicon theoretical specific capacity of 4200 mAh/g. Similarly, tin (Sn), tin alloys and tin compounds can intercalate/alloy with lithium with a fairly high capacity and a desirable voltage range. Tin metal has a theoretical specific capacity of 993 mAh/g with respect to lithium alloying. Therefore, tin based active materials, such as tin, tin alloys (e.g., with Zn, Cd or In), tin oxides (SnO, $Sn_2O_3$ or $Sn_3O_4$), tin compounds (e.g., $ZnSnO_4$) or mixtures thereof, can be used as a high specific capacity anode active material. In general, to achieve the desired energy densities for the batteries, any high capacity anode material can be used having a specific capacity of at least approximately 700 mAh/g. The anode material can have a specific capacity from about 800 mAh/g to about 2500 mAh/g, in other embodiments from about 900 mAh/g to about 2450 mAh/g and in further embodiments from about 950 mAh/g to about 2400 mAh/g at a rate of C/3 discharged from 1.5 V to 0.005 V against lithium. A person of ordinary skill in the art will recognize that additional ranges of specific capacity within the explicit ranges above are contemplated and are within the present disclosure.

Also, elemental silicon as well as other high capacity materials in a negative electrode of a lithium-based battery can exhibit in some formulations a large irreversible capacity loss (IRCL) in the first charge/discharge cycle of the battery. The high IRCL of a silicon-based anode can consume a significant portion of the capacity available for the battery's energy output. Since the cathode, i.e., positive electrode, supplies all of the lithium in a traditional lithium ion battery, a high IRCL in the anode, i.e., negative electrode, can result in a low energy battery. In order to compensate for the large anode IRCL, supplemental lithium can be added to the negative electrode material to offset the IRCL. The use of supplemental lithium to improve the performance of silicon based electrodes is described also in the '294 application cited above, and published U.S. patent application 2012/0295155 to Deng et al. (the '155 application) entitled: "Silicon Oxide Based High Capacity Anode Materials for Lithium Ion Batteries", both incorporated herein by reference. The use of supplemental lithium in the improved battery designs is described further below.

High capacity silicon based anode undergoes volume expansion during the charge/discharge process. To adapt to the volume expansion, the anode of the batteries described herein can use nanostructured active silicon based materials to accommodate better for volume expansion and thus maintain the mechanical electrode stability and cycle life of the battery. Nanostructured silicon based negative electrode compositions are disclosed in the '294 application, the '155 application, as well as published U.S. Patent Application 2013/0189575 to Anguchamy et al. (the '575 application), entitled: "Porous Silicon Based Anode Material Formed Using Metal Reduction," all incorporated herein by reference.

Suitable nanostructured silicon can include, for example, nanoporous silicon and nanoparticulate silicon. Also, nanostructured silicon can be formed into composites with carbon and/or alloys with other metal elements. The objective for the design of improved silicon-based materials is to further stabilize the negative electrode materials over cycling while maintaining a high specific capacity and in some embodiments reducing the irreversible capacity loss in the first charge and discharge cycle. Furthermore, pyrolytic carbon coatings are also observed to stabilize silicon-based materials with respect to battery performance.

Silicon nanoparticles can provide a high surface area material that can desirably adapt to volume changes in the material during silicon-lithium alloying. In general, nanoparticle silicon can comprise amorphous and/or crystalline silicon nanoparticles. Crystalline silicon nanoparticles can be desirable in some embodiments because of their larger electrical conductivity, relative to amorphous silicon nanoparticles. As used herein, nanoparticle silicon can comprise submicron particles with an average primary particle diameter of no more than about 500 nm, in further embodiments no more than about 250 nm, and in additional embodiments no more than about 200 nm. A particle diameter refers to the average diameters along principle axes of a particle. Primary particle dimensions refer to the dimensions of the particulates visible in a transmission electron micrograph, and the primary particles may or may not exhibit some degree of agglomeration and/or fusing. The primary particle size generally reflects the surface area of the particle collection, which is a significant parameter for performance as a battery active material. In some embodiments, the BET surface area can range from about 1 $m^2/g$ to about 100 $m^2/g$, and in further embodiments form about 5 $m^2/g$ to about 80 $m^2/g$. BET surface areas can be evaluated, for example, using commercially available instruments. A person of ordinary skill in the art will recognize that additional ranges of particle size and surface areas within the explicit ranges above are contemplated and are within the present disclosure.

Another suitable form of nanostructured silicon comprises porous silicon particles with nanostructured pores, and negative electrode active material can desirably comprise porous silicon and/or composites thereof. Porous silicon can have improved cycling behavior due to its high surface area and/or void volume, which can facilitate accommodation of volume changes with lithium alloying and de-alloying. In some embodiments, doped and non-doped porous silicon can be formed on bulk silicon by electrochemical etching of silicon wafers. Recent work has developed porous silicon with significantly improved battery performance through the reduction of silicon oxide, as described further below.

In some embodiments, the negative electrode active composition can comprise a silicon-metal alloy and/or intermetallic material. Suitable silicon-metal intermetallic alloys are described in U.S. Pat. No. 8,277,974 to Kumar et al., entitled "High Energy Lithium Ion Batteries with Particular Negative Electrode Compositions," incorporated herein by reference. The alloy/intermetallic materials can be represented by the formula $Si_xSn_qM_yC_z$ where $(q+x)>2y+Z$, $q≥0$, $z≥0$, and M is metal selected from manganese, molybdenum, niobium, tungsten, tantalum, iron, copper, titanium, vanadium, chromium, nickel, cobalt, zirconium, yttrium, and combinations thereof. See also, published U.S. patent application 2007/0148544A to Le, entitled "Silicon-Containing Alloys Useful as Electrodes for Lithium-Ion Batteries," incorporated herein by reference. In the materials described herein, generally the carbon materials and processing conditions are selected such that the carbon does not form a SiC compound with the silicon. Results have been presented with alloys or composites having z=0 and q=0, so that the formula simplifies to $Si_xM_y$, where x>2y and M=Fe or Cu. See the '294 application cited above. The alloys were formed by appropriate milling.

With respect to the composite materials, nanostructured silicon components can be combined with, for example, carbon nanoparticles and/or carbon nanofibers. The components can be, for example, milled to form the composite, in which the materials are intimately associated. Generally, it is believed that the association has a mechanical characteristic, such as the softer silicon coated over or mechanically affixed with the harder carbon materials. In additional or alternative embodiments, the silicon can be milled with metal powders to form alloys, which may have a corresponding nanostructure. The carbon components can be combined with the silicon-metal alloys to form multi-component composites.

Also, carbon coatings can be applied over the silicon-based materials to improve electrical conductivity, and the carbon coatings seem to also stabilize the silicon based material with respect to improving cycling and decreasing irreversible capacity loss. Desirable carbon coatings can be formed by pyrolyzing organic compositions. The organic compositions can be pyrolyzed at relatively high temperatures, e.g., about 800° C. to about 900° C., to form a hard amorphous coating. In some embodiments, the desired organic compositions can be dissolved in a suitable solvent, such as water and/or volatile organic solvents for combining with the silicon based component. The dispersion can be well mixed with silicon-based composition. After drying the mixture to remove the solvent, the dried mixture with the silicon based material coated with the carbon precursor can be heated in an oxygen free atmosphere to pyrolyze the organic composition, such as organic polymers, some lower molecular solid organic compositions and the like, and to form a carbon coating, such as a hard carbon coating. The carbon coating can lead to surprisingly significant improvement in the capacity of the resulting material. Also, environmentally friendly organic compositions, such as sugars and citric acid, have been found to be desirable precursors for the formation of pyrolytic carbon coatings. Elemental metal coatings, such as silver or copper, can be applied as an alternative to a pyrolytic carbon coating to provide electrical conductivity and to stabilize silicon-based active material. The elemental metal coatings can be applied through solution based reduction of a metal salt.

In some embodiments, the negative electrode active material comprises a composite of a carbon material and a silicon-based material. The silicon material, the carbon material or both can be nanostructured, and the nanostructured components can then be combined to form a composite of the silicon component and the carbon component. For example, the components of the composite can be milled together to form the composite, in which the constituent materials are intimately associated, but generally not alloyed. The nanostructures characteristics are generally expected to manifest themselves in the composite, although characterization of the composites may be less established relative to the characterization of the component materials. Specifically, the composite material may have dimensions, porosity or other high surface area characteristics that are manifestations of the nano-scale of the initial materials. In some embodiments, the negative electrode active material can comprise a silicon-based material coated onto a carbon nanofibers and/or carbon nanoparticles.

Porous Silicon (pSi) Based Material

Desirable high capacity negative electrode active materials can comprise porous silicon (pSi) based materials and/or composites of the porous silicon based materials. In general, the pSi based material comprises highly porous crystalline silicon that can provide high surface areas and/or high void volume relative to bulk silicon. While nanostructured porous silicon can be formed through a variety of approaches such as electrochemical etching of a silicon wafer, particularly good battery performance has been obtained from nanostructured porous silicon obtained by metal reduction of silicon oxide powders. In particular, the material has particularly good cycling properties while maintaining a high specific capacity. The formation of composites of pSi based material with carbon based material or metal can additionally mechanically stabilize the negative electrode for improved cycling. Additional description of the pSi based material from the reduction of silicon oxide can be found in the '575 application referenced above.

The porous silicon based material can be formed using metal reduction, which in some embodiments comprises gradual heating followed by acid etching to produce the pSi based material. The etching can be used to remove byproduct metal oxide material, the removal of which can contribute to the desired porosity. In some embodiments, the pSi based material generally is substantially free of elemental carbon within the nanostructured material. The nanostructured pSi can have surface area from about 10 m$^2$/g to about 200 m$^2$/g and in additional embodiments from about 10 m$^2$/g to about 150 m$^2$/g. A person of ordinary skill in the art will recognize that additional ranges of values within the explicit BET surface area ranges above are contemplated and are within the present disclosure. For a given particle size, the surface area of a porous material can also relate to the pore sizes and void volumes.

While the pSi nanostructured material is substantially free of carbon, an electrode formed from the pSi based material can comprise a carbon component, such as a nano-scale carbon (e.g., nanotubes, fibers or particles), graphitic carbon and/or a pyrolytic carbon coating to provide an electrically conductive additive that is not intimately milled with the porous silicon. Desirable pyrolytic carbon coatings can be formed from organic compositions that can be applied with a solvent to obtain a relatively uniform coating prior to and after pyrolyzing the organic composition to form the carbon coating. An elemental metal coating can be applied as an alternative to a carbon coating. When the negative electrode is made from a porous silicon based material, the electrode can have a first cycle C/20 charge capacity in the range of about 3000 mAh/g to about 3900 mAh/g and discharge capacity in the range of about 2400 mAh/g to about 2800 mAh/g, a C/3 discharge capacity in the range of about 1800 to about 2600 mAh/g, and an irreversible capacity loss of less than about 35%. The pSi based material can have specific capacity of at least about 2000 mAh/g when cycled at C/3 rate. The pSi based materials can be effectively cycled with a high capacity lithium rich positive electrode active material. The resulting lithium ion batteries can have high specific capacities for both the negative electrode active material and the positive electrode active material.

Silicon Oxide Carbon (SiO—C) Based Composites

Silicon oxide based compositions have been formed into composite materials with high capacities and very good cycling properties as described in the '155 application referenced above. In particular, oxygen deficient silicon oxides can be formed into composites with electrically conductive materials, such as conductive carbons or metal powders, which surprisingly significantly improve cycling while providing for high values of specific capacity. Furthermore, the milling of the silicon oxides into smaller particles, such as submicron structured materials, can further improve the performance of the materials. The silicon oxide based materials maintain their high capacities and good cycling as negative electrode active materials when placed into lithium ion batteries with high capacity lithium metal oxide positive electrode active materials. The cycling can be further improved with the addition of supplemental lithium into the battery and/or with an adjustment of the balance of the active materials in the respective electrodes. Supplemental lithium can replace at least some of the lithium lost to the irreversible capacity loss due to the negative electrode and can stabilize the positive electrode with respect to cycling. When configured with high capacity lithium rich manganese oxides based positive electrodes, the silicon oxide based electrode can exhibit excellent cycling at reasonable rates. Based on appropriate designs of the batteries, high energy density batteries can be produced, and the batteries are suitable for a range of commercial applications.

As with silicon, oxygen deficient silicon oxide, e.g., silicon oxide, SiO$_x$, 0.1≤x≤1.9, can intercalate/alloy with lithium such that the oxygen deficient silicon oxide can perform as an active material in a lithium ion battery. These oxygen deficient silicon oxide materials are generally referred to as silicon oxide based materials and in some embodiments can contain various amounts of silicon, silicon oxide, and silicon dioxide. The oxygen deficient silicon oxide can incorporate a relatively large amount of lithium such that the material can exhibit a large specific capacity. However, silicon oxide is observed generally to have a capacity that fades quickly with battery cycling, as is observed with elemental silicon. The silicon oxides can be made into composite materials to address the cycling fade of the silicon oxide based materials. For example, composites can be formed with electrically conductive components that contribute to the conductivity of the electrode as well as the stabilization of the silicon oxide during cycling.

Silicon oxide based materials with greater capacity upon cycling can be produced through the milling of the silicon oxide to form smaller particles. Additionally, the silicon oxide based materials can be formed into composites with electrically conductive powders in combination with high energy mechanical milling (HEMM) or the like. Alternatively or additionally, the silicon oxide based materials can be subjected to high temperature heat treatment. Smaller silicon oxide particles obtained from HEMM treatment has shown greater capacity in either silicon oxide electrode or electrodes with composites of silicon oxide-conductive carbon particle, e.g., graphitic carbon, than commercial silicon oxides with larger particle sizes. Pyrolytic carbon coated silicon oxide composites showed improved conductivity and specific capacity. Silicon oxide composites with inert metal particles with or without a pyrolytic carbon coating have shown very good cycling performance at high specific capacity. Suitable inert metal particles are described further below. The milling of the silicon oxide based materials with metal powders seems to reduce the introduction of inert material from the grinding medium, e.g., zirconium oxide, into the product composite. Composites of silicon oxide, graphite, and pyrolytic carbon in particular have shown significantly improved specific capacity and cycling performance.

HEMM and/or heat treatment under appropriate conditions can result in some disproportionation of oxygen deficient silicon oxides into SiO$_2$ and elemental Si. Small crystalline silicon peaks are observed under some processing conditions. It is possible that the processed materials have some components of amorphous elemental silicon and/or small crystallites within the structure. However, it is believed that most of the silicon oxide based materials used herein have significant components of oxygen deficient silicon oxide and amounts of elemental silicon have not been quantified. In some embodiments, elemental silicon powders, such as submicron silicon particles, can be included in the formation of composites with silicon oxide based materials.

In general, a range of composites are used and can comprise silicon oxide, carbon components, such as graphitic particles (Gr), inert metal powders (M), elemental silicon (Si), especially nanoparticles, pyrolytic carbon coatings (HC), carbon nano fibers (CNF), or combinations thereof. Thus, the general compositions of the composites can be represented as αSiO-βGr-χHC-δM-εCNF-φSi, where α, β, χ, δ, ε, and φ are relative weights that can be selected such that α+β+χ+δ+ε+φ=1. Generally 0.35<α<1, 0≤β<0.6, 0≤χ<0.65, 0≤δ<0.65, 0≤ε<0.65, and 0≤φ<0.65. Certain subsets of these composite ranges are of particular interest. In some embodiments, composites with SiO and one or more carbon based components are desirable, which can be represented by a formula $\alpha SiO\text{-}\beta Gr\text{-}\chi HC\text{-}\varepsilon CNF$, where $0.35<\alpha<0.9$, $0\le\beta<0.6$, $0\le\chi<0.65$ and $0\le\varepsilon<0.65$ ($\delta=0$ and $\phi=0$), in further embodiments $0.35<\alpha<0.8$, $0.1\le\beta<0.6$, $0.0\le\chi<0.55$ and $0\le\varepsilon<0.55$, in some embodiments $0.35<\alpha<0.8$, $0\le\beta<0.45$, $0.0\le\chi<0.55$ and $0.1\le\varepsilon<0.65$, and in additional embodiments $0.35<\alpha<0.8$, $0\le\beta<0.55$, $0.1\le\chi<0.65$ and $0\le\varepsilon<0.55$. In additional or alternative embodiments, composites with SiO, inert metal powders and optionally one or more conductive carbon components can be formed that can be represented by the formula $\alpha SiO\text{-}\beta Gr\text{-}\chi HC\text{-}\delta M\text{-}\varepsilon CNF$, where $0.35<\alpha<1$, $0\le\beta<0.55$, $0\le\chi<0.55$, $0.1\le\delta<0.65$, and $0\le\varepsilon<0.55$. In further additional or alternative embodiments, composites of SiO with elemental silicon and optionally one or more conductive carbon components can be formed that can be represented by the formula $\beta SiO\text{-}\beta Gr\text{-}\chi HC\text{-}\varepsilon CNF\text{-}\phi Si$, where $0.35<\alpha<1$, $0\le\beta<0.55$, $0\le\chi<0.55$, $0\le\varepsilon<0.55$, and $0.1\le\phi<0.65$ and in further embodiments $0.35<\alpha<1$, $0\le\beta<0.45$, $0.1\le\chi<0.55$, $0\le\chi<0.45$, and $0.1\le\phi<0.55$. A person or ordinary skill in the art will recognize that additional ranges within the explicit ranges above are contemplated and are within the present disclosure. As used herein, the reference to composites implies application of significant combining forces, such as from HEMM milling, to intimately associate the materials, in contrast with simple blending, which is not considered to form composites.

The association of conductive carbon with the silicon oxide active material can improve the performance of the silicon oxide material in a lithium ion battery. Composites with electrically conductive materials and silicon oxide active material described herein provide very good cycling performance. A milling process can be used to incorporate electrically conductive diluents to form an intimate composite through the milling process. Graphitic carbon, e.g., nanostructured conductive carbon, carbon nanoparticles and/or carbon nanofibers, can provide a good electrically conductive medium for the formation of composites with silicon oxide. High energy milling can generally be performed with a hard ceramic milling media, such as zirconium oxide particles. Milling can result in the incorporation of some milling media into the product composite material. Since the milling media is electrically insulating and electrochemically inert, it is desirable to keep the amount of milling media in the product composite material, after separation of the bulk quantities of milling beads, to a low or possibly undetectable level. Pyrolytic carbon coatings are also observed to stabilize silicon oxide based materials with respect to battery performance. In particular, the pyrolytic carbon coatings can be placed over the initially prepared composites to provide an additional electrically conductive component of the product material. The combination of the pyrolytic carbon with a silicon oxide-particulate conductor composite provides surprisingly improved performance in some embodiments. The formation of pyrolytic carbon coatings is described further above. In further embodiments, elemental metal coatings, such as silver or copper, can be applied as an alternative to a pyrolytic carbon coating to provide electrical conductivity and to stabilize silicon oxide based active material. The elemental metal coatings can be applied through solution based reduction of a metal salt.

In additional or alternative embodiments, the silicon oxide can be milled with metal powders, in which the silicon oxide is milled to a smaller particle size and the metal is intimately combined with the silicon oxide material to form a composite material, for example with a nanostructure. The carbon components can be combined with the silicon-metal alloys to form multi-component composites. The composite materials with intimately combined components are distinguishable from simple blends of components held together with a polymer binder, which lacks mechanical and/or chemical interactions to form a single composite material.

Solution based approaches for the synthesis of various Si—SiO$_x$—C-M (M=metal) composites are described in copending U.S. patent application Ser. No. 13/864,212 to Han et al., entitled "Silicon-Based Active Materials for Lithium Ion Batteries and Synthesis With Solution Processing," incorporated herein by reference. Silicon-based carbon composites with graphene sheets are described in copending U.S. patent application Ser. No. 13/917,472 to Anguchamy et al., entitled "Silicon-Silicon Oxide-Carbon Composites For Lithium Battery Electrodes and Methods for Forming the Composites," incorporated herein by reference. Commercial materials that are believed to comprise a SiO$_x$—Si—C or SiO$_x$—Si composite are available from Shin-Etsu of Japan, and are used in the batteries in the Examples.

The capacity of the anode significantly governs the energy density of the battery. The higher the capacity of the anode material the lower is the weight of the anode in the battery. When the negative electrode is made from a silicon based material, the electrode can have a discharge specific capacity at a rate of C/3 from about 800 mAh/g to 2500 mAh/g, in further embodiments from about 900 mAh/g to about 2300 mAh/g and in other embodiments from about 950 mAh/g to about 2200 mAh/g at C/3 discharge from 1.5 V to 5 mV against lithium metal. A person of ordinary skill in the art will recognize that additional ranges of discharge specific capacity within the explicit ranges above are contemplated and are within the present disclosure.

Negative Electrode Active Material Blends

In some embodiments, it can be desirable to combine the silicon based active material with a significant amount of graphitic carbon active material. It has been found that a combination of the two negative electrode active materials can stabilize the cycling a desirable degree, such as for consumer electronics applications, which only a modest decrease in the capacity. The combination of active materials is distinct from the formation of composite materials in that the combination is at most a physical blend without the application of milling forces that would be expected to form an intimate single material. Thus, the two active materials in the combination function as independent active materials in the resulting negative electrodes. Also, the graphitic carbon active materials are generally independent of conductive carbon for the negative electrode, which generally comprises nanoscale carbon powders as noted herein.

Graphite, synthetic graphite and other graphitic carbons can be collectively referred to as graphitic carbons. Graphitic carbon is available commercially and generally has average particle sizes of a micron or greater and moderate values of surface area. In some embodiments, the graphitic carbon can have a D50 (mass median diameter) from about 5 microns to about 50 microns, in further embodiments from about 7 microns to about 45 microns and in additional embodiments from about 10 microns to about 8 microns to about 40 microns. Also, in some embodiments the BET surface area of graphitic carbon active material can be from about 0.25 m$^2$/g to about 12 m$^2$/g, in further embodiments from about 0.5 m$^2$/g to about 10 m$^2$/g and in additional embodiments from about 0.75 m$^2$/g to about 8 m$^2$/g. A person of ordinary skill in the rt will recognize that additional ranges of particle size and surface area for graphitic carbon active materials are contemplated and are within the present disclosure. In contrast, electrically conductive carbon blacks or the like generally have surface areas of roughly 25 $m^2/g$ or greater.

To achieve desired cycling stabilization with modest decrease in capacity, the combined negative electrode active material generally comprises from about 5 wt % to about 70 wt % graphitic carbon, in further embodiments from about 10 wt % to about 60 wt %, in additional embodiments from about 12 wt % to about 55 wt % and in other embodiments from about 15 wt % to about 45 wt % graphitic carbon relative to the total active material, with the remaining portion of the active material being a silicon based active material or a combination thereof. A person of ordinary skill in the art will recognize that additional ranges of active material compositions within the explicit ranges above are contemplated and are within the present disclosure. As noted above, suitable silicon based active materials can comprise a carbon component. It is not generally believed that this carbon component of the composite with silicon is not active in electrochemistry and generally not graphitic. In any case, such carbon components of a silicon based composite are nevertheless distinguishable through the particulate nature of added graphitic carbon intended to contribute to stabilized cycling as demonstrated in the examples below. The other features of the negative electrode and ranges of electrode parameters described herein apply equally to electrodes with the combination of silicon based active materials and graphitic carbon active materials.

Electrodes

The active material loading in the binder can be large. In some embodiments, the positive electrode comprises from about 85 to about 99% of positive electrode active material, in other embodiments from about 90 to about 98% of the positive electrode active material, and in further embodiments from about 95 to about 98% of the positive electrode active material. In some embodiments, the negative electrode has from about 60 to about 95% of negative electrode active material, in other embodiments from about 70 to about 92% of the negative electrode active material, and in further embodiments from about 75 to about 88% of the negative electrode active material. A person of ordinary skill in the art will recognize that additional ranges of particles loadings within the explicit ranges about are contemplated and are within the present disclosure.

In some embodiments, the positive electrode has from about 0.75 to about 10% polymeric binder, in other embodiments from about 0.8 to about 7.5% polymeric binder, and in further embodiments from about 0.9 to about 5% polymeric binder. In some embodiments, the negative electrode has from about 2 to about 30% polymeric binder, in other embodiments about 5 to 25% polymeric binder, and in further embodiments from about 8 to 20% polymeric binder. A person of ordinary skill in the art will recognize that additional ranges of polymer loadings within the explicit ranges above are contemplated and are within the present disclosure.

The positive electrode composition, and in some embodiments the negative electrode composition, generally can also comprise an electrically conductive additive distinct from the electroactive composition. In some embodiments, to achieve improved performance a conductive additive can have a conductivity of at least about 40 S/cm, in some embodiments at least about 50 S/cm, and in further embodiments at least about 60 S/cm. A person of ordinary skill in the art will recognize that additional ranges of conductivity within the explicit ranges above are contemplated and are within the present disclosure. Electrical conductivity, which is the inverse of resistivity, is reported by distributors, and the conductivity is generally measured using specific techniques developed by the distributors. For example, measurements of carbon black electrical resistance is performed between two copper electrodes with Super P™ carbon blacks, see Timcal Graphite & Carbon, A Synopsis of Analytical Procedures, 2008, www.timcal.com. Suitable supplemental electrically conductive additives include, for example, graphite, graphene, carbon fibers, carbon black, metal powders, such as silver powders, metal fibers, such as stainless steel fibers, and the like, and combinations thereof. Carbon nanotubes have been found to be a desirable conductive additive that can improve cycling performance for either a positive electrode or a negative electrode. In particular, for high loading levels of active materials in the electrodes, e.g., at least about 20 $mg/cm^2$, carbon nanotubes provided surprising improvement in the rate capabilities of the resulting electrodes relative to electrodes formed with other electrically conductive additives even though the electrical conductivities of the materials were similar.

In some embodiments, the positive electrode can have 0.4 weight percent to about 12 weight percent conductive additive, in further embodiments from about 0.45 weight percent to about 7 weight percent, and in other embodiments from about 0.5 weight percent to about 5 weight percent conductive additive. Similarly, the negative electrode can have 1 weight percent to about 20 weight percent conductive additive, in further embodiments from about 1.5 weight percent to about 15 weight percent, and in other embodiments from about 2 weight percent to about 10 weight percent conductive additive. In some embodiments, the conductive additive used in the negative electrode can comprise carbon nanotubes, carbon nanofibers or combinations thereof, although other combinations of conductive carbon conductive additives can be used. The conductive additive used in the positive electrode can also be a combination of electrically conductive additives. Specifically, in some embodiments, the conductive additive used in the positive electrode is a combination of carbon nanotubes with optionally an additional conductive additive including, for example, carbon fibers, carbon nano-fibers, nanostructured carbon, graphene, carbon blacks, KS6, Super-P, or a combination thereof. A person of ordinary skill in the art will recognize that additional ranges of amounts of electrically conductive additive within the explicit ranges above are contemplated and are within the present disclosure.

The positive electrode and negative electrode used in the batteries described herein can have high loading levels along with reasonably high electrode density. For a particular loading level, the density is inversely correlated with thickness so that an electrode with a greater density is thinner than an electrode with a lower density. Loading is equal to the density times the thickness. In some embodiments, the negative electrode of the battery has a loading level of negative electrode active material that is at least about 1.5 $mg/cm^2$, in other embodiments from about 2 $mg/cm^2$ to about 8 $mg/cm^2$, in additional embodiments from about 2.5 $mg/cm^2$ to about 6 $mg/cm^2$, and in other embodiments from about 3 $mg/cm^2$ to about 4.5 $mg/cm^2$. In some embodiments, the negative electrode of the battery has a density in some embodiment from about 0.5 g/cc (cc=cubic centimeters ($cm^3$)) to about 2 g/cc, in other embodiment from about 0.6 g/cc to about 1.5 g/cc, and in additional embodiments from about 0.7 g/cc to about 1.3 g/cc. A person of ordinary skill in the art will recognize that additional ranges of active material loading level and electrode densities within the explicit ranges above are contemplated and are within the present disclosure.

In some embodiments, the positive electrode of the battery has a loading level of positive electrode active material that is from about 10 to about 40 mg/cm$^2$, in other embodiments from about 12 to about 37.5 mg/cm$^2$, in additional embodiments from about 13 to about 35 mg/cm$^2$, and in other embodiments from 20 to about 32.5 mg/cm$^2$ In some embodiments, the positive electrode of the battery has an active material density in some embodiment from about 2.5 glee to about 4.6 g/cc, in other embodiment from about 3.0 g/cc to 4.4 g/cc, and in additional embodiment from about 3.25 g/cc to about 4.3 g/cc. A person of ordinary skill in the art will recognize that additional ranges of active material loading level and electrode densities within the explicit ranges above are contemplated and are within the present disclosure.

In some embodiments, when the positive electrode or negative electrode uses a high loading level, the density of the electrode can be reduced to provide good cycling stability of the electrode. The density of the electrodes is a function, within reasonable ranges, of the press pressures. Generally, the density of the electrodes cannot be arbitrarily increased without sacrificing performance with respect to loading levels while achieving desired cycling performance and capacity at higher discharge rates.

Each electrode generally is associated with an electrically conductive current collector to facilitate the flow of electrons between the electrode and an exterior circuit. A current collector can comprise a metal structure, such as a metal foil or a metal grid. In some embodiments, a current collector can be formed from nickel, aluminum, stainless steel, copper or the like. An electrode material can be cast as a thin film onto a current collector. In some embodiments, an electrode can be loaded onto each surface of a current collector to improve battery performance. The electrode material with the current collector can then be dried, for example in an oven, to remove solvent from the electrode. In some embodiments, a dried electrode material in contact with a current collector foil or other structure can be subjected to a pressure from about 2 to about 10 kg/cm$^2$ (kilograms per square centimeter). The current collector used in the positive electrode can have a thickness from about 5 microns to about 30 microns, in other embodiments from about 10 microns to about 25 microns, and in further embodiments from about 14 microns to about 20 microns. In one embodiment, the positive electrode uses an aluminum foil current collector. The current collector used in the negative electrode can have a thickness from about 2 microns to about 20 microns, in other embodiments from about 4 microns to about 14 microns, and in further embodiments from about 6 microns to about 10 microns. In one embodiment, the negative electrode uses copper foil as current collector. A person of ordinary skill in the art will recognize that additional ranges of current collector within the explicit ranges above are contemplated and are within the present disclosure.

For electrode stacks, the areas of the electrodes can be selected reasonably based on the volume and design constraints for the particular application. Use for some consumer electronics devices may suggest particular battery designs, while in other embodiments conventional battery shapes and sizes can be used. In some embodiments, the lengths and widths of a generally prismatic shaped battery can be independently from about 15 mm to about 500 mm, in further embodiments from about 17.5 mm to about 400 mm and in additional embodiments from about 20 to about 350 mm. Thicknesses of the batteries can be from about 1 mm to about 15 mm, in further embodiments from 1.5 mm to about 13.5 mm and in additional embodiments from about 2 mm to about 12 mm. The volumes of the battery can range from 500 mm$^3$ to about 100,000 mm$^3$, in further embodiments from about 750 mm$^3$ to about 75,000 mm$^3$ and in other embodiments from about 1000 mm$^3$ to about 50,000 mm$^3$. For a wound cell, the two electrodes and separator are placed together and then wound, generally along a mandrel or the like using an appropriate apparatus. To obtain the corresponding volume, the length is generally substantially greater than the width. The widths can generally be from about 15 mm to about 100 mm and in further embodiments from about 20 mm to about 80 mm. The ratio of the length, corresponding to the wound dimension, to the width can be from about 3 to about 25 and in further embodiments from about 4 to about 20. Following winding, a spirally wound electrode can be prismatic, cylindrical or other convenient shape. Cylindrical batteries can have diameters from about 5 mm to about 50 mm, in further embodiments from about 7 mm to about 40 mm and in additional embodiments from about 8 mm to about 30 mm. A prismatic wound electrode can have overall dimensions as an electrode stack described above. A person of ordinary skill in the art would recognize that additional ranges of dimensional parameters within the explicit ranges above are contemplated and are within the present disclosure.

General Battery Features

The separator is located between the positive electrode and the negative electrode. The separator is electrically insulating while providing for at least selected ion conduction between the two electrodes. A variety of materials can be used as separators. Some commercial separator materials can be formed from polymers, such as polyethylene and/or polypropylene that are porous sheets that provide for ionic conduction. Commercial polymer separators include, for example, the Celgard® line of separator material from Hoechst Celanese, Charlotte, N.C. Suitable separator materials include, for example, 12 micron to 40 micron thick trilayer polypropylene-polyethylene-polypropylene sheets, such as Celgard® M824, which has a thickness of 12 microns. Also, ceramic-polymer composite materials have been developed for separator applications. These composite separators can be stable at higher temperatures, and the composite materials can significantly reduce the fire risk. Polymer-ceramic composites for lithium ion battery separators are sold under the trademark Separion® by Evonik Industries, Germany. In the examples, batteries are demonstrated with "glue" type separators that are formed using solution coating techniques using polymers suitable as electrode binders that provide suitable ionic conduction.

The electrolyte provides for ion transport between the anode and cathode of the battery during the charge and discharge processes. We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride, lithium difluoro oxalato borate, and combinations thereof. In some embodiments, the electrolyte comprises a 1 M concentration of the lithium salts, although greater or lesser concentrations can be used.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in copending U.S. patent applications 2011/0136019 to Amiruddin et al. entitled: "Lithium ion battery with high voltage electrolytes and additives", incorporated herein by reference.

Electrolyte with fluorinated additives has shown to further improve the battery performance for batteries with silicon based negative electrode active material. The fluorinated additives can include, for example, fluoroethylene carbonate, fluorinated vinyl carbonate, monochloro ethylene carbonate, monobromo ethylene carbonate, 4-(2,2,3,3-tetrafluoropropoxymethyl)-[1,3]dioxolan-2-one, 4-(2,3,3,3-tetrafluoro-2-trifluoro methyl-propyl)-[1,3]dioxolan-2-one, 4-trifluoromethyl-1,3-dioxolan-2-one, bis(2,2,3,3-tetrafluoro-propyl) carbonate, bis(2,2,3,3,3-pentafluoro-propyl) carbonate, or mixtures thereof. In some embodiments, the electrolyte can comprise from about 1 weight percent to about 35 weight percent halogenated carbonate, in further embodiments from about 3 weight percent to about 30 weight percent and in other embodiments from about 5 weight percent to about 20 weight percent halogenated carbonate in the electrolyte as a fraction of the solvent plus electrolyte salt, as a fraction of the total electrolyte weight. A person of ordinary skill in the art will recognize that additional ranges of halogenated carbonate concentrations within the explicit ranges above are contemplated and are within the present disclosure.

As described further in the Examples below, the incorporation of halogenated carbonate into the electrolyte has been observed to significantly improve the specific capacity and the cycling properties of batteries. Also, electrolytes with fluoroethylene carbonate have been found to have excellent low temperature performance as described in published U.S. patent application 2013/0157147 to Li et al. (the '147 application), entitled "Low Temperature Electrolyte for High Capacity Lithium Based Batteries," incorporated herein by reference. In some Examples, the electrolyte is formulated using a commercial consumer electronic electrolyte comprising ethylene carbonate, diethylcarbonate, and additives with added fluorethylene carbonate, and as demonstrated below excellent cycling results are obtained. The fluoroethylene carbonate component has been found to provide desirable stabilization for silicon based electrodes relative to electrolytes that provide suitable commercial performance for consumer electronics batteries with graphitic anodes.

The battery described herein can be assembled into various commercial battery designs such as prismatic shaped batteries, wound cylindrical batteries, coin cell batteries, or other reasonable battery shapes. The batteries can comprise a single pair of electrodes or a plurality of pairs of electrodes assembled in parallel and/or series electrical connection(s). While the materials described herein can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors, and the resulting jellyroll structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used, as well as prismatic cells and foil pouch batteries of selected sizes.

Pouch cell batteries can be particularly desirable for various applications, including certain consumer electronics applications, due to stacking convenience and relatively low container weight. A pouch battery design for vehicle batteries incorporating a high capacity cathode active material is described in detail in U.S. Pat. No. 8,187,752 to Buckley et al, entitled "High Energy Lithium Ion Secondary Batteries" and published U.S. patent application 2012/0028105 to Kumar et al. (the '105 application), entitled "Battery Packs for Vehicles and High Capacity Pouch Secondary Batteries for Incorporation into Compact Battery Packs," both incorporated herein by reference. While the pouch battery designs are particularly convenient for use in specific battery pack designs, the pouch batteries can be used effectively in other contexts as well with high capacity in a convenient format. Desirable results are presented in the examples with a prismatic shaped pouch battery with wound electrodes. In one embodiment, the pouch cell batteries described herein uses a ceramic type of separator to improve cycling stability and safety of the battery.

Figure 1C:
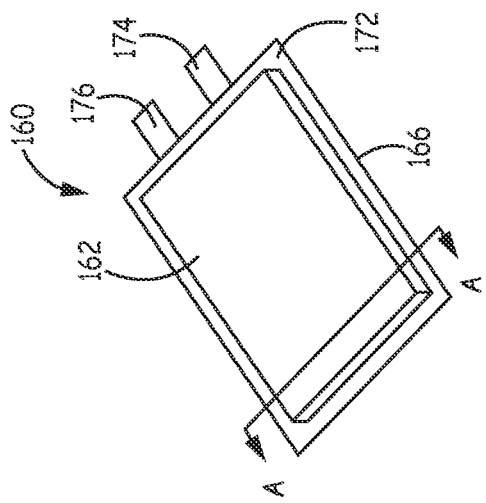
FIG. 1(c) is a bottom plan view of the pouch battery of FIG. 1(b).
Figure 1A:
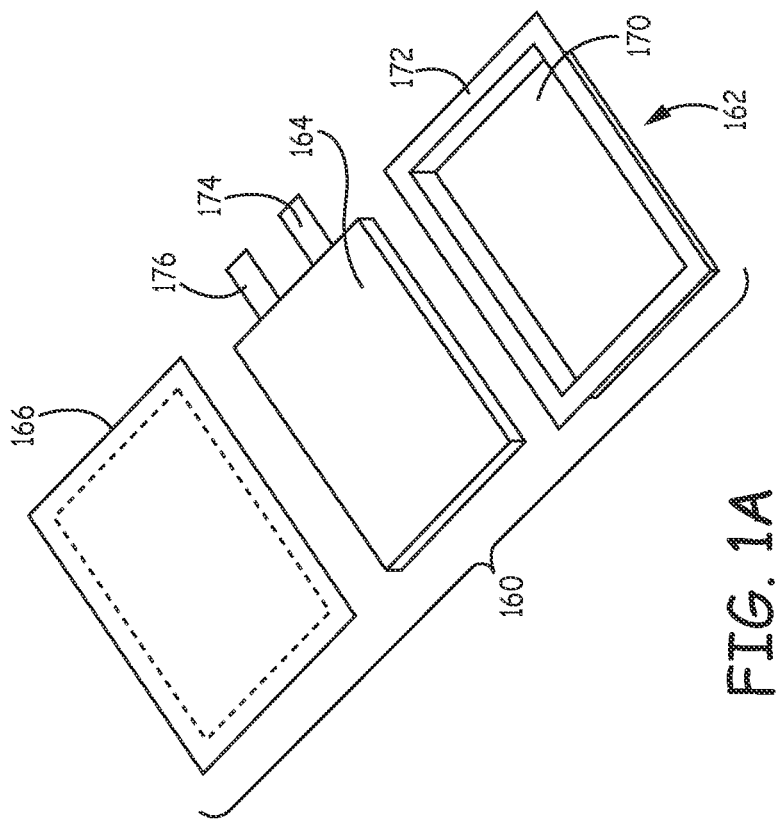
FIG. 1(a) is an expanded view of a pouch battery with a battery core separated from two portions of the pouch case.

A representative embodiment of a pouch battery is shown in FIGS. 1(a) to 1(d). In this embodiment, pouch battery 160 comprises pouch enclosure 162, battery core 164 and pouch cover 166. A battery core is discussed further below. Pouch enclosure 162 comprises a cavity 170 and edge 172 surrounding the cavity. Cavity 170 has dimensions such that battery core 164 can fit within cavity 170. Pouch cover 166 can be sealed around edge 172 to seal battery core 164 within the sealed battery, as shown in FIGS. 1(b) and 1(c). Terminal tabs 174, 176 extend outward from the sealed pouch for electrical contact with battery core 164. FIG. 1(c) is a schematic diagram of a cross section of the battery of FIG. 1(b) viewed along the A-A line. Many additional embodiments of pouch batteries are possible with different configurations of the edges and seals.

Figure 1D:
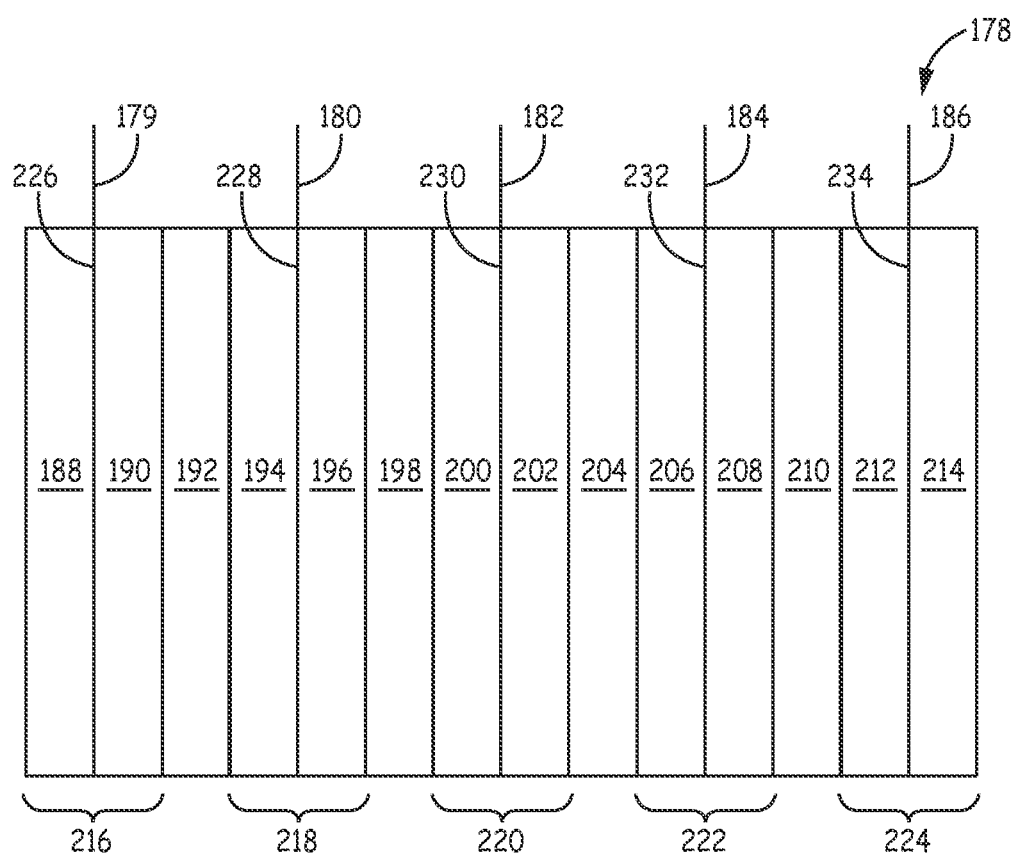
FIG. 1(d) is depiction of an embodiment of a battery core comprising an electrode stack.

FIG. 1(d) shows an embodiment of a battery core 164 that generally comprise an electrode stack. In this embodiment, electrode stack 178 comprises negative electrode structures 216, 220, 224, positive electrode structures 218, 222, and separators 192, 198, 204, 210 disposed between the adjacent positive and negative electrodes. Negative electrode structures 216, 220, 224 comprise negative electrodes 188, 190, negative electrodes 200, 202 and negative electrodes 212, 214, respectively, disposed on either side of current collectors 226, 230, 234. Positive electrode structures 218, 222 comprise positive electrodes 194, 196 and positive electrodes 206, 208, respectively, disposed on opposite sides of current collectors 228, 232, respectively. Tabs 179, 180, 182, 184, 186 are connected to current collectors 226, 228, 230,

232, 234, respectively, to facilitate the connection of the individual electrodes in series or in parallel. For vehicle applications, tabs are generally connected in parallel, so that tabs 179, 182, 186 would be electrically connected to an electrical contact accessible outside the container, and tabs 180, 184 would be electrically connected to an electrical contact as an opposite pole accessible outside the container.

Electrode stacks can have an extra negative electrode such that both outer electrodes adjacent the container are negative electrodes. Generally, a battery with stacked electrodes of the dimensions described herein have from 5 to 25 negative electrode elements (current collector coated on both sides with active material) and in further embodiments from 7 to 20 negative electrode elements with corresponding numbers of positive electrode elements being generally one less than the negative electrode elements. A person of ordinary skill in the art will recognize that additional ranges of electrode numbers within the explicit ranges above are contemplated and are within the present disclosure. As noted above, wound electrodes can be correspondingly used for either a cylindrical battery or a roughly prismatic shaped battery. Designs for prismatic shaped batteries with wound electrodes are described further, for example, in the '221 patent cited above. A particular design of either a stacked set of electrodes or a wound cell can be influenced by the target dimensions and the target capacity of the battery.

Supplemental Lithium and Electrode Balance

The improved high energy battery designs described herein may or may not include supplemental lithium, and this section is directed to approaches for the incorporation of supplemental lithium for appropriate embodiments as well as to describe the balance of negative electrode and positive electrode capacity balance. In general, the inclusion of supplemental lithium is desirable for batteries with silicon-based negative electrode active materials since the material exhibit relatively high irreversible capacity loss during the initial charge of the battery. Various approaches can be used for the introduction of supplemental lithium into the battery, although following corresponding initial reactions and/or charging, the negative electrode becomes associated with excess lithium for cycling from the supplemental lithium. In general, the negative electrode capacity can be set to be somewhat greater than the sum of the positive electrode capacity and the supplemental lithium capacity to avoid lithium metal plating during battery charging.

With respect to the negative electrode in batteries having supplemental lithium, the structure and/or composition of the negative electrode can change relative to its initial structure and composition following the first cycle as well as following additional cycling. Depending on the approach for the introduction of the supplemental lithium, the positive electrode may initially comprise a source of supplemental lithium and/or a sacrificial electrode can be introduced comprising supplemental lithium. Additionally or alternatively, supplemental lithium can be associated with the negative electrode. In some embodiments, the supplemental lithium can be introduced into the negative electrode using electrochemical methods in contrast with purely chemical or mechanical methods. Electrochemical methods, chemical methods or mechanical methods, such as milling, may lead to effectively irreversible formation of lithium silicate, which could work as a buffer layer when the anode expands in lithiation. With respect to initial structure of the negative electrode, in some embodiments, the negative electrode has no changes due to the supplemental lithium. In particular, if the supplemental lithium is initially located in the positive electrode or a separate electrode, the negative electrode can be an unaltered form with no lithium present until the battery is charged or at least until the circuit is closed between the negative electrode and the electrode with the supplemental lithium in the presence of electrolyte and a separator. For example, the positive electrode or supplemental electrode can comprise elemental lithium, lithium alloy and/or other sacrificial lithium source.

If sacrificial lithium is included in the positive electrode, the lithium from the sacrificial lithium source is loaded into the negative electrode during the charge reaction. The voltage during the charging based on the sacrificial lithium source may be significantly different than the voltage when the charging is performed based on the positive electrode active material. For example, elemental lithium in the positive electrode can charge the negative electrode active material without application of an external voltage since oxidation of the elemental lithium drives the reaction. For some sacrificial lithium source materials, an external voltage is applied to oxidize the sacrificial lithium source in the positive electrode and drive lithium into the negative electrode active material. The charging generally can be performed using a constant current, a stepwise constant voltage charge or other convenient charging scheme. However, at the end of the charging process, the battery should be charged to a desired voltage.

In further embodiments, at least a portion of the supplemental lithium is initially associated with the negative electrode. For example, the supplemental lithium can be in the form of elemental lithium, a lithium alloy or other lithium source that is more electronegative than the negative electrode active material. After the negative electrode is in contact with electrolyte, a reaction can take place, and the supplemental lithium is transferred to the negative electrode active material. During this process, the solid electrolyte interface (SEI) layer may also be formed. Thus, the supplemental lithium is loaded into the negative electrode active material with at least a portion consumed in formation of the SEI layer. The supplemental lithium placed into the negative electrode should be more electronegative than the active material in the negative electrode since there is no way of reacting the supplemental lithium source with the active material in the same electrode through the application of a voltage.

In some embodiments, supplemental lithium associated with the negative electrode can be incorporated as a powder within the negative electrode. Specifically, the negative electrode can comprise an active negative electrode composition and a supplemental lithium source within a polymer binder matrix, and any electrically conductive powder if present. In additional or alternative embodiments, the supplemental lithium is placed along the surface of the electrode. For example, the negative electrode can comprise an active layer with an active negative electrode composition and a supplemental lithium source layer on the surface of active layer. The supplemental lithium source layer can comprise a foil sheet of lithium or lithium alloy, supplemental lithium powder within a polymer binder and/or particles of supplemental lithium source material embedded on the surface of the active layer. In an alternative configuration, a supplemental lithium source layer is between the active layer and current collector. Also, in some embodiments, the negative electrode can comprise supplemental lithium source layers on both surfaces of the active layer.

In additional embodiments, at least a portion of the supplemental lithium can be supplied to the negative electrode active material prior to assembly of the battery. In other words, the negative electrode can comprise partially lithium-loaded silicon based active material, in which the partially loaded active material has a selected degree of loading of lithium through intercalation/alloying or the like. For example, for the preloading of the negative electrode active material, the negative electrode active material can be contacted with electrolyte and a lithium source, such as elemental lithium, lithium alloy or other sacrificial lithium source that is more electronegative than the negative electrode active material. Since the electrochemical pre-lithiation of the negative electrode may induce initial irreversible changes to the negative electrode, the prelithiated negative electrode may not have any active lithium if the prelithiation is designed to just compensate for the first cycle irreversible capacity loss, which presumably also results in SEI formation.

An arrangement to perform such a preloading of lithium can comprise an electrode with silicon-based active material formed on a current collector, which are placed in vessel containing electrolyte and a sheet of lithium source material contacting the electrode. The sheet of lithium source material can comprise lithium foil, lithium alloy foil or a lithium source material in a polymer binder optionally along with an electrically conductive powder, which is in direct contact with the negative electrode to be preloaded with lithium such that electrons can flow between the materials to maintain electrical neutrality while the respective reactions take place. In the ensuing reaction, lithium is loaded into the silicon based active material through intercalation, alloying or the like. In alternative or additional embodiments, the negative electrode active material can be mixed in the electrolyte and the lithium source material for incorporation of the supplemental lithium prior to formation into an electrode with a polymer binder so that the respective materials can react in the electrolyte spontaneously.

In some embodiments, the lithium source within an electrode can be assembled into a cell with the electrode to be preloaded with lithium. A separator can be placed between the respective electrodes. Current can be allowed to flow between the electrodes. Depending on the composition of the lithium source it may or may not be necessary to apply a voltage to drive the lithium deposition within the silicon-based active material. An apparatus to perform this lithiation process can comprise a container holding electrolyte and a cell, which comprises an electrode, to be used as a negative electrode in an ultimate battery, a current collector, a separator and a sacrificial electrode that comprises the lithium source, where the separator is between the sacrificial electrode and the electrode with the silicon-based active material. A convenient sacrificial electrode can comprise lithium foil, lithium powder embedded in a polymer or lithium alloys, although any electrode with extractable lithium can be used. The container for the lithiation cell can comprise a conventional battery housing, a beaker, or any other convenient structure. This configuration provides the advantage of being able to measure the current flow to meter the degree of lithiation of the negative electrode. Furthermore, the negative electrode can be cycled once or more than once in which the negative electrode active material is loaded close to full loading with lithium. In this way, an SEI layer can be formed with a desired degree of control during the preloading with lithium of the negative electrode active material. Then, the negative electrode is fully formed during the preparation of the negative electrode with a selected preloading with lithium.

In general, the lithium source can comprise, for example, elemental lithium, a lithium alloy or a lithium composition, such as a lithium metal oxide, that can release lithium from the composition. Elemental lithium can be in the form of a thin film, such as formed by evaporation, sputtering or ablation, a lithium or lithium alloy foil and/or a powder. Elemental lithium, especially in powder form, can be coated to stabilize the lithium for handling purposes, and commercial lithium powders, such as powders from FMC Corporation, are sold with proprietary coatings for stability. The coatings generally do not alter the performance of the lithium powders for electrochemical applications. Lithium alloys include, for example, lithium silicon alloys and the like. Lithium composition with intercalated lithium can be used in some embodiments, and suitable compositions include, for example, lithium titanium oxide, lithium tin oxide, lithium cobalt oxide, lithium manganese oxide, and the like.

In general, for embodiments in which supplemental lithium is used, the amount of supplemental lithium preloaded or available to load into the active composition can be in an amount of at least about 10% of capacity, in further embodiments from about 15 percent to about 50 percent of capacity, in additional embodiments from about 20 percent to about 48 percent of capacity, and in some embodiments from about 22 percent to about 46 percent of the negative electrode active material capacity. The supplemental lithium can be selected to approximately balance the IRCL of the negative electrode, although other amounts of supplemental lithium can be used as desired. In some embodiment, the supplemental lithium added is in an amount with an oxidation capacity corresponding to from 90% to 170% of the IRCL of the negative electrode, in further embodiments, it is from 100% to 165%, and in other embodiments from 105% to 160%. A person of ordinary skill in the art will recognize that additional ranges of percentage within the explicit ranges above are contemplated and are within the present disclosure.

The positive electrode active material capacity can be estimated from the capacity of the material which can be measured by cycling the material against lithium metal foil. For example, for a given positive electrode, the capacity can be evaluated by determining the insertion and extraction capacities during the first charge/discharge cycle, where the lithium is de-intercalated or extracted from the positive electrode to 4.6 V and intercalated or inserted back into the positive electrode to 2 V at a rate of C/20. Similarly, for a given silicon based electrode, the insertion and extraction capacities can be evaluated with a battery having a positive electrode comprising the silicon based active material and a lithium foil negative electrode. The capacity is evaluated by determining the insertion and extraction capacities of the battery during the first charge/discharge cycle where lithium is intercalated/alloyed to the silicon based electrode to 5 mV and de-intercalated/de-alloyed to 1.5 V at a rate of C/20.

In most commercially available carbon based batteries, approximately 7-10% excess anode is taken over the cathode to prevent lithium plating. One important concern of too much excess anode is that the weight of the cell increases reducing the energy density of the cell. Compared to graphite which has a first cycle IRCL of ~7%, high capacity silicon based anodes can have IRCL ranging from about 10% to about 40%. A major portion of the capacity may become inactive in the cell after the first charge-discharge cycle and can add to significant dead weight to the battery.

For the materials described herein, the drop in capacity with cycling of the negative electrode is generally greater than for the positive electrode, so that the avoidance of lithium metal deposition with cycling suggests a greater excess capacity of the negative electrode to further stabilize cycling. Roughly, if the negative electrode capacity fades about twice as fast as the positive electrode capacity, it would be desirable to include at least 10% additional negative electrode capacity to account for cycling. In the robust battery design, at least about 10% additional negative electrode can be desired at various discharge conditions. In general, the balance can be selected such that the initial negative electrode charge capacity at a rate of C/20 from an open circuit voltage to 1.5 V against lithium is about 110% to about 170%, in further embodiment from about 112.5% to about 160% and in additional embodiments from about 115% to about 150% relative to the initial positive electrode charge capacity at a rate of C/20 from an open circuit voltage to 4.6 V. A person of ordinary skill in the art will recognize that additional ranges of balance within the explicit ranges above are contemplated and are within the present disclosure.

EXAMPLES

Batteries were prismatic pouch cells with dimensions specified below. The tested batteries had stacks of electrodes in some embodiments and wound electrodes in other embodiments. The pouch cells with stacked electrodes had 11 layers of positive electrode and 12 layers of negative electrode or for some 1.3 Ah batteries 13 layers of positive electrode and 14 layers of negative electrode unless noted otherwise. The electrolyte was a commercial consumer electronic electrolyte comprising ethylene carbonate, diethylcarbonate, greater than 1M $LiPF_6$ and some stabilizing additives to which fluorethylene carbonate was added to provide 8-15 wt % of the electrolyte. As noted in the tables below, ratios of negative electrode capacities to positive electrode capacities (N/P) do not include contributions of supplemental lithium, which are separately presented.

Negative electrodes were formed from commercial SiO—Si—C composite active materials, although it is believed that other high capacity silicon based materials described above can be used to achieve comparable or improved performance. For convenience the resulting electrodes are simply referred to in the Examples as silicon based anodes. In general, a powder of the silicon based active material was mixed thoroughly with an electrically conductive carbon additive, such as a blend of acetylene black (Super P® from Timcal, Ltd., Switzerland) with either graphite, carbon nanofibers or carbon nanotubes, to form a homogeneous powder mixture. Separately, polyimide binder was mixed with N-methyl-pyrrolidone ("NMP") (Sigma-Aldrich) and stirred overnight to form a polyimide-NMP solution. The homogenous powder mixture was then added to the polyimide-NMP solution and mixed for about 2 hours to form a homogeneous slurry. The slurry was applied onto a copper foil current collector to form a thin, wet film and the laminated current collector was dried in a vacuum oven to remove NMP and to cure the polymer. The laminated current collector was then pressed between rollers of a sheet mill to obtain a desired lamination thickness.

Positive electrodes were formed from commercial lithium cobalt oxide powder by initially mixing it thoroughly with conducting carbon black (Super P™ from Timcal, Ltd, Switzerland) and either graphite (KS 6™ from Timcal, Ltd), carbon nanofibers or carbon nanotubes to form a homogeneous powder mixture. Separately, Polyvinylidene fluoride PVDF (KF1300™ from Kureha Corp., Japan) was mixed with N-methyl-pyrrolidone (Sigma-Aldrich) and stirred overnight to form a PVDF-NMP solution. The homogeneous powder mixture was then added to the PVDF-NMP solution and mixed for about 2 hours to form homogeneous slurry. The slurry was applied onto an aluminum foil current collector to form a thin, wet film and the laminated current collector was dried in vacuum oven at 110° C. for about two hours to remove NMP. The laminated current collector was then pressed between rollers of a sheet mill to obtain a desired lamination thickness. The dried positive electrode comprised at least about 90 weight percent active metal oxide, at least about 0.5 weight percent electrically conductive carbon, and at least about 0.8 weight percent polymer binder.

Some of the batteries fabricated from a silicon based negative electrode and a positive lithium cobalt oxide electrode can further comprise supplemental lithium. In particular, a desired amount of SLMP® powder (FMC Corp., stabilized lithium metal powder) was loaded into a vial and the vial was then capped with a mesh comprising nylon or stainless steel with a mesh size between about 40 μm to about 80 μm. SLMP® (FMC corp.) was then deposited by shaking and/or tapping the loaded vial over a formed silicon based negative electrode. The coated silicon based negative electrode was then compressed to ensure mechanical stability.

Batteries fabricated from a silicon based negative electrode and a positive electrode were balanced to have excess negative electrode material. In particular, for a given silicon based active composition, the insertion and extraction capacities of the silicon based composition can be evaluated in a battery setting. For example, a battery that has a positive electrode comprising the silicon based active material with a counter lithium foil negative electrode can be constructed. The insertion and extraction capacities of the silicon based composition in the electrode equals to the first cycle battery capacity measured when lithium is intercalated/alloyed to the porous silicon based electrode to 5 mV and de-intercalated/de-alloyed to 1.5 V at a rate of C/20. Specific values of the excess negative electrode balance and supplemental lithium are provided in the specific examples below.

The cycling of some batteries included clamping in which the battery was placed between two plates of either metal or a polymer/glass composite with bolts at the 4 corners of the plates to set up a clamp system. A uniform pressure of 4-10 PSI was applied on the cell by tightening the bolts using a torque wrench. Other batteries were not clamped, and the electrodes were just subjected to modest forces involved in the assembly of the pouch cell.

Example 1

Pouch Batteries

In this example, eight pouch batteries with electrode stacks were assembled to test the battery performance with several selected designs.

Figure 2:
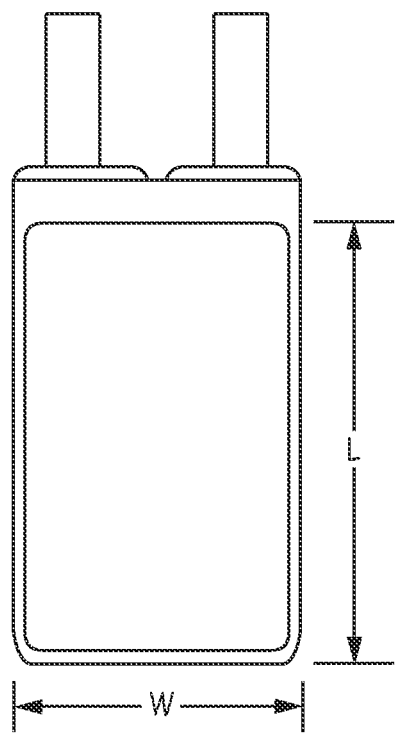
FIG. 2 is a photograph of an embodiment of a high capacity pouch battery as described herein with a roughly 1 Ah capacity and silicon based anode active material.

The batteries were prepared using the compositions and methods described above with the silicon based negative electrode active material and the lithium cobalt oxide positive electrode active material. The prepared electrodes were then assembled into the pouch battery and electrolyte was added. The cathode (positive electrode) loading was 25 mg/cm² with 97.7 wt % active material in the cathode. The lithium cobalt oxide had a capacity of 177 mAh/g and the silicon based active material had a specific capacity of 2150 mAh/g. The batteries had physical dimensions of 33.5 mm width, 52 mm length and from 3.15 mm to 3.23 mm thickness, and cathodes with 97.7 wt % active material and a loading of 25 mg/cm². For these batteries, the cathode active material had a specific capacity of 177 mAh/g and the anode active material had a specific capacity of 2150 mAh/g measured against lithium metal. SLMP has a specific capacity of 3600 mAh/g. The anode to cathode capacity balance is specified as the ratio N/P, so the anode is a multiple of the cathode (positive electrode) capacity. A picture of one of the batteries is shown in FIG. 2. Other design parameters of the 8 batteries are summarized in Tables 1 and 2. These batteries were cycled without clamping.

TABLE 1

|  | Battery (1) 1 Ah | Battery (2) 1.3 Ah | Battery (3) 1.3 Ah | Battery (4) 1 Ah | Battery (5) 1 Ah |
|---|---|---|---|---|---|
| Anode active (%) | 85% | 85% | 77.50% | 80% | 85% |
| Anode loading (mg/cm$^2$) | 3.50 | 3.50 | 3.84 | 4.00 | 3.50 |
| Formation N/P ratio (%) | 148.00% | 148.00% | 148.00% | 159.00% | 148.00% |
| Lithiation (%) | 30% | 30% | 30% | 43% | 28% |
| Energy density @ C/10, 4.35~2.0 (2.75) V (Wh/L) | ≈701 | ≈678~701 | ≈678~701 | ≈588 | ≈678 |
| Energy density @ C/10, 4.35~3.0 V (Wh/L) | 640 |  |  | ≈ |  |
| Cycle life (cycles) | ≈100 | >150 |  |  |  |

TABLE 2

|  | Battery (6) 0.8 Ah | Battery (7) 0.8 Ah | Battery (8) 0.8 Ah | Battery (9) 0.8 Ah |
|---|---|---|---|---|
| Anode active (%) | 85% | 85% | 85% | 82% |
| Anode loading (mg/cm2) | 3.50 | 3.50 | 3.84 | 3.63 |
| Formation N/P ratio (%) | 148.00% | 148.00% | 148.00% | 148.00% |
| Lithiation (%) | 30% | 30%/42% | 30% | 30% |
| Energy density @ C/10, 4.35~2.0 (2.75) V (Wh/L) | ≈701 | ≈678~701 | ≈678~701 | ≈588 |
| Energy density @ C/10, 4.35~3.0 V (Wh/L) | 640 |  |  | ≈ |
| Cycle life (cycles) | ≈100 | >150 |  |  |

Figure 3:
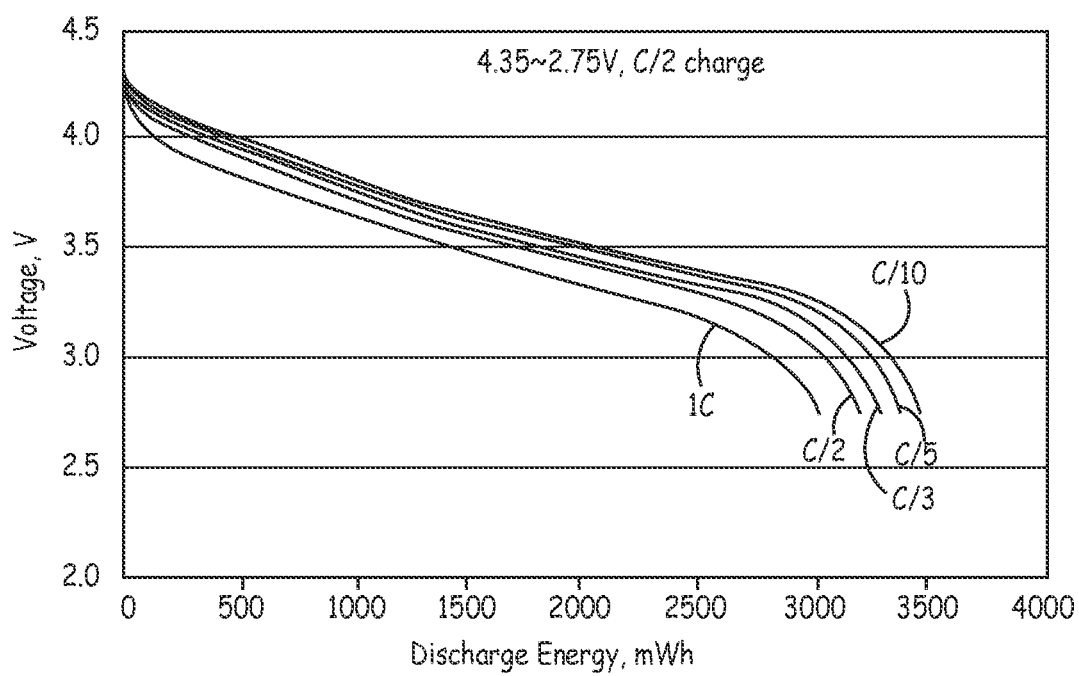
FIG. 3 is a plot of voltage versus discharge energy for an embodiment of a high capacity pouch battery as described herein at 5 discharge rates from 4.35 V to 2.75 V following a C/2 charge after a formation cycle.

More detailed results are presented for battery 1 and battery 7 of Table 2. Specific details of battery 1 are presented in Tables 3 and 64 and in FIG. 3. With respect to rate dependence of the volumetric energy density, this battery had the following values, 701 Wh/l at C/10, 684 Wh/l at C/5, 668 at C/3, 651 at C/2 and 613 at 1 C.

TABLE 3

| Cell Size (m) L*W*T | 46*33.5*3.23 |
|---|---|
| Cell Weight (g) | 12.8 |
| Charge cut-off voltage (v) | 4.35 |
| Discharge cut-off voltage (v) | 3.00 |
| Nominal voltage | 3.60 (C/10) |
| Internal impedance at 1000 HZ | 32.9 |

TABLE 3-continued

| Capacity (mAh) | 884 (C/10) |
|---|---|
| Energy (mWh) | 3185 (C/10) |
| Energy density - weight (Wh/Kg) | 249 (C/10) |
| Energy density - volume (Wh/L) | 640 (C/10) |

TABLE 4

(4.35 V-3.0 V, no clamping)

| Rate | Discharge Energy (mWh) | Discharge Capacity (mAh) | Energy density (Wh/L) |
|---|---|---|---|
| 1/10 C | 3185 | 884 | 640 |
| 1/5 C | 3123 | 870.8 | 627 |
| 1/3 C | 3029 | 849.7 | 608 |
| 1/2 C | 2928 | 826.8 | 588 |
| 1 C | 2705 | 776.6 | 543 |

Figure 4:
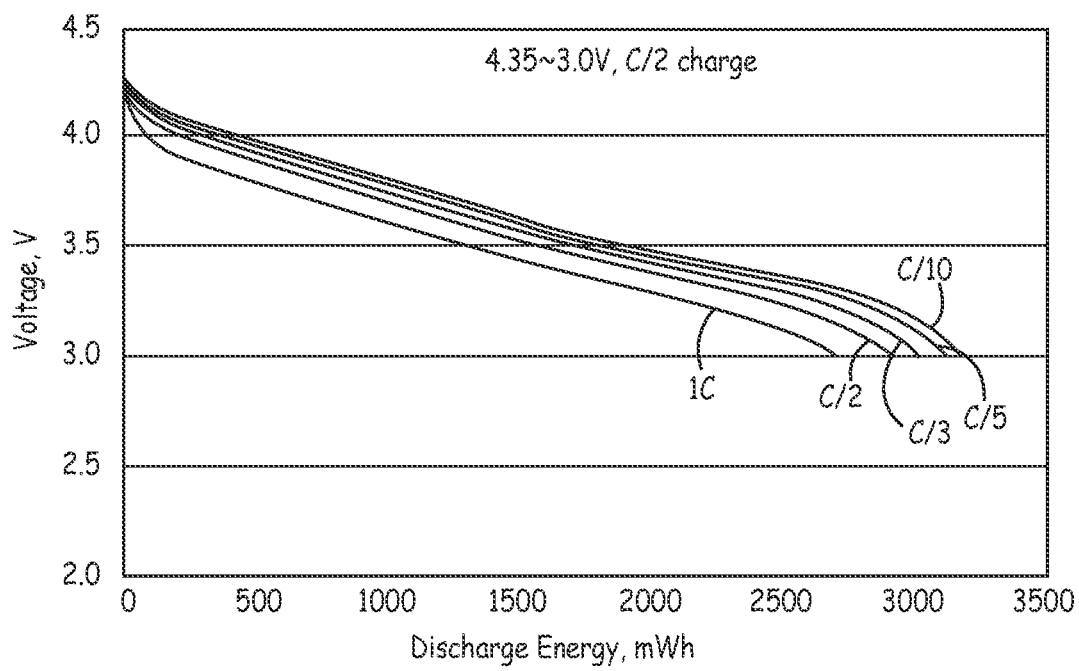
FIG. 4 is a plot of voltage versus discharge energy for another high capacity pouch battery embodiment at 5 discharge rates from 4.35 V to 3 V following a C/2 charge after a formation cycle.

Similarly, specific details for battery 7 are presented in Tables 5 and 6, and in FIG. 4.

TABLE 5

| Cell Size (mm) L*W*T | 46*33.5*3.2 |
|---|---|
| Cell Weight (g) | 12.9 |
| Charge cut-off voltage (v) | 4.35 |
| Discharge cut-off voltage (v) | 2.75 |
| Nominal voltage | 3.58 |
| Internal impedance at 1000 HZ | 32.9 |
| Capacity (mAh) | 966.7 (C/10) |
| Energy (mWh) | 3456 (C/10) |
| Energy density - weight (Wh/Kg) | 267.9 (C/10) |
| Energy density - volume (Wh/L) | 701 (C/10) |

TABLE 6

(4.35 V-2.75 V)

| Rate | Discharge Energy (mWh) | Discharge Capacity (mAh) | Energy density (Wh/L) |
|---|---|---|---|
| 1/10 C | 3456 | 966.7 | 701 |
| 1/5 C | 3371 | 945.1 | 684 |
| 1/3 C | 3295 | 928.6 | 668 |

TABLE 6-continued

| | (4.35 V-2.75 V) | | |
| --- | --- | --- | --- |
| | Discharge | | Energy density |
| Rate | Energy (mWh) | Capacity (mAh) | (Wh/L) |
| 1/2 C | 3208 | 910.1 | 650 |
| 1 C | 3023 | 873.3 | 613 |

Example 2

Pouch Batteries with Particular Formats & Quantities of Electrolytes

Several additional pouch batteries were produced using different constructions and quantities of electrolyte.

Figure 5:
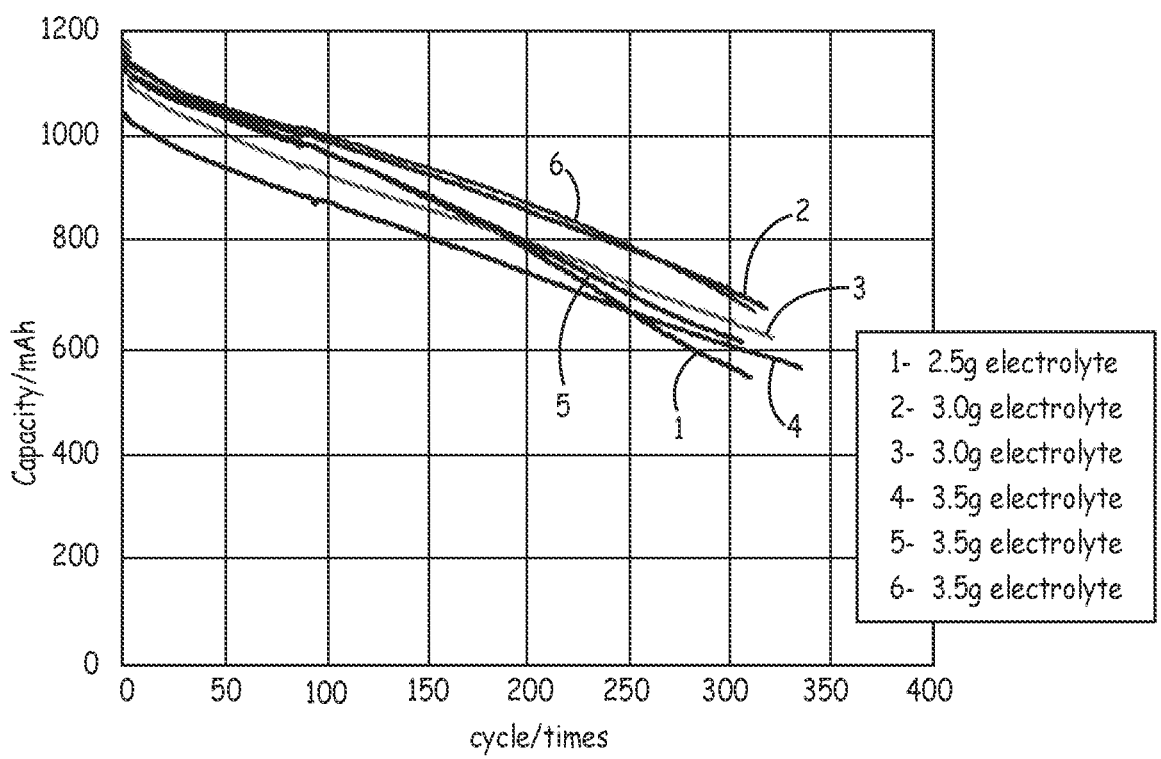
FIG. 5 is a plot of capacity versus cycle for 6 high capacity pouch batteries with 1 battery having 2.5 g of electrolyte, 2 batteries having 3.0 g electrolyte and three batteries having 3.5 g electrolyte.

Six pouch batteries were formed with target roughly 1.3 Ah capacity as described above with 1 battery having 2.5 g electrolyte, 2 batteries with 3.0 g electrolyte and 3 batteries with 3.5 g electrolyte. The batteries had stacked electrodes with clamping. After the initial cycles, the batteries were cycled for over 300 cycles at a discharge rate of C/3 from 4.35 V to 3.0 V. The results are shown in FIG. 5. There are no clear differences between the performance of the batteries with 3.0 g or 3.5 g of electrolyte, but the battery with 2.5 g of electrolyte seemed to have poorer cycling performance.

Figure 6:
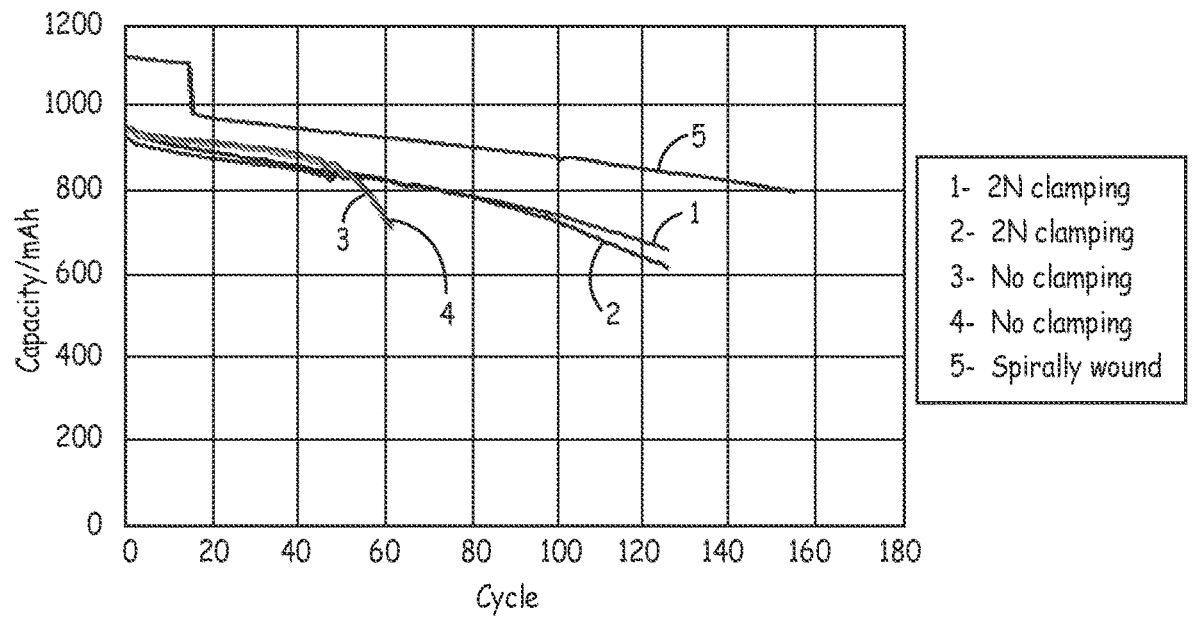
FIG. 6 is a plot of capacity versus cycle for 5 high capacity pouch batteries with 1 battery having spirally wound electrodes, 2 batteries having stacked electrodes with clamping of the stack and 2 batteries having stacked electrodes with no clamping.
Figure 7:
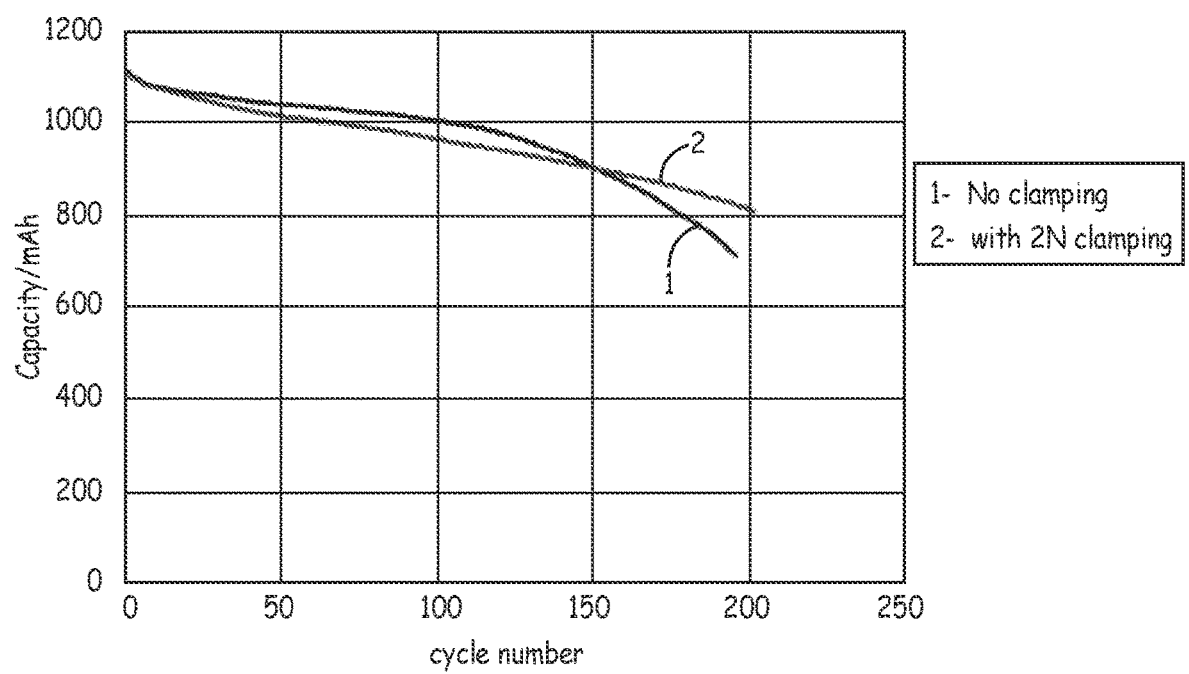
FIG. 7 is a plot of capacity as a function of cycle for high capacity pouch batteries having stacked electrodes with improved electrode design for cycling with one battery having clamped electrodes and 1 battery having unclamped electrodes.

Five pouch batteries were formed to test the electrode configuration in the pouch format. One battery was spirally wound, two batteries were cycled having stacked electrodes with clamping and two batteries had stacked electrodes cycled with no clamping. After the initial cycles, the batteries were cycled at a discharge rate of C/3 from 4.35 V to 2.75 V. The results are shown in FIG. 6. The spirally wound cell had the best cycling performance, and the cells with no clamping with stacked electrodes began to have deteriorated performance after about 50 cycles. The results with the stacked electrodes were reproduced with a change of cathode binder and somewhat more conducting agent in the cathode to improve the cycling performance. These results are shown in FIG. 7. Improved cycling was found for both clamped and unclamped battery cycling, but the battery cycled without clamping still exhibited deteriorating performance at greater than about 150 cycles.

Figure 8:
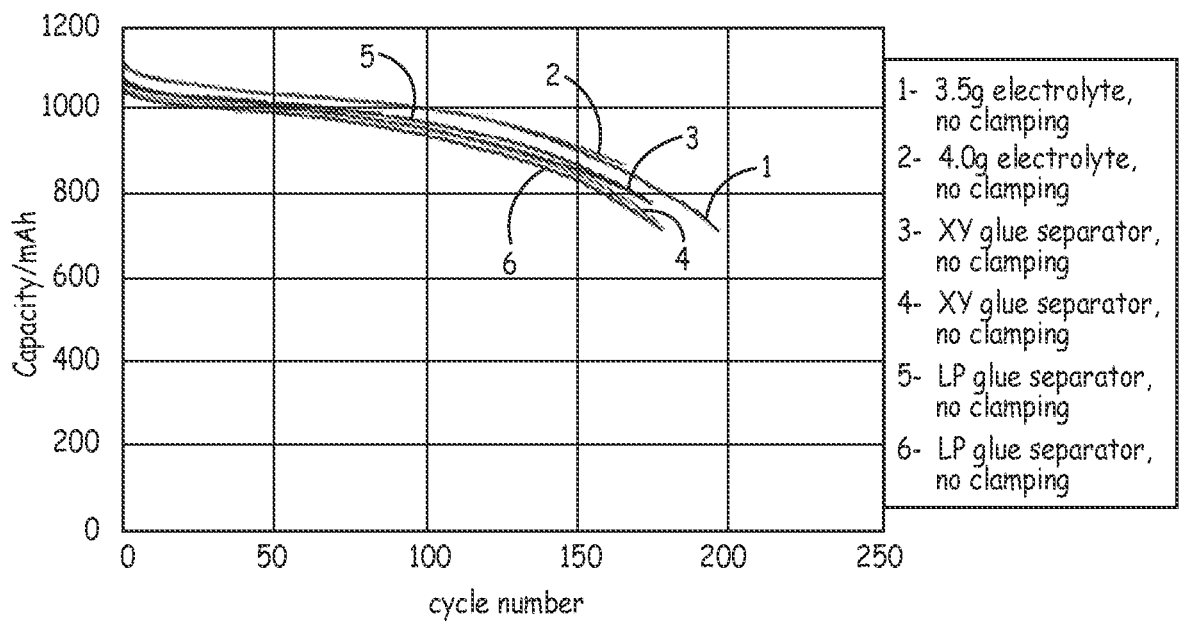
FIG. 8 is a plot of capacity as a function of cycle number for 6 high capacity batteries with 1 battery having 3.5 g electrolyte with stacked electrodes and no clamping, a second battery having 4.0 g electrolyte with stacked electrodes and no clamping, two additional batteries having a glue separator of a first type with stacked electrodes and no clamping, and two other batteries having a glue separator of a second type with stacked electrodes and no clamping.

Six additional batteries were formed with an approximate 1.3 Ah design. Two of these batteries were cycled with no clamping and either 3.5 g electrolyte or 4.0 g electrolyte. Four batteries were formed with glue separators, a liquid polymer composition that is dried between the electrode. Two glues were used from commercial sources to form two batteries each. After the first few cycles, the batteries were cycled at a discharge rate of C/3 from 4.35 V to 3.0 V, and the cycling results are plotted in FIG. 8. The batteries with the different amounts of electrolyte had similar performance, and the batteries with glue separators had a lower capacity and no improvement in cycling.

Example 3

Long Cycling Batteries

This example demonstrates the ability of silicon-based lithium ion batteries to exhibit sufficient cycling stability for commercial consumer electronics applications, specifically maintaining roughly 80% capacity or more after 300 cycles.

Two battery designs were tested with wound electrodes. The active materials, electrode structures and assembly are described above. Battery 1 had dimensions of 36.0 mm length, 20.7 mm width and 7.3 mm thickness, and battery 2 had dimensions of 36.0 mm length, 20.6 mm width and 7.5 mm thickness.

Figure 9:
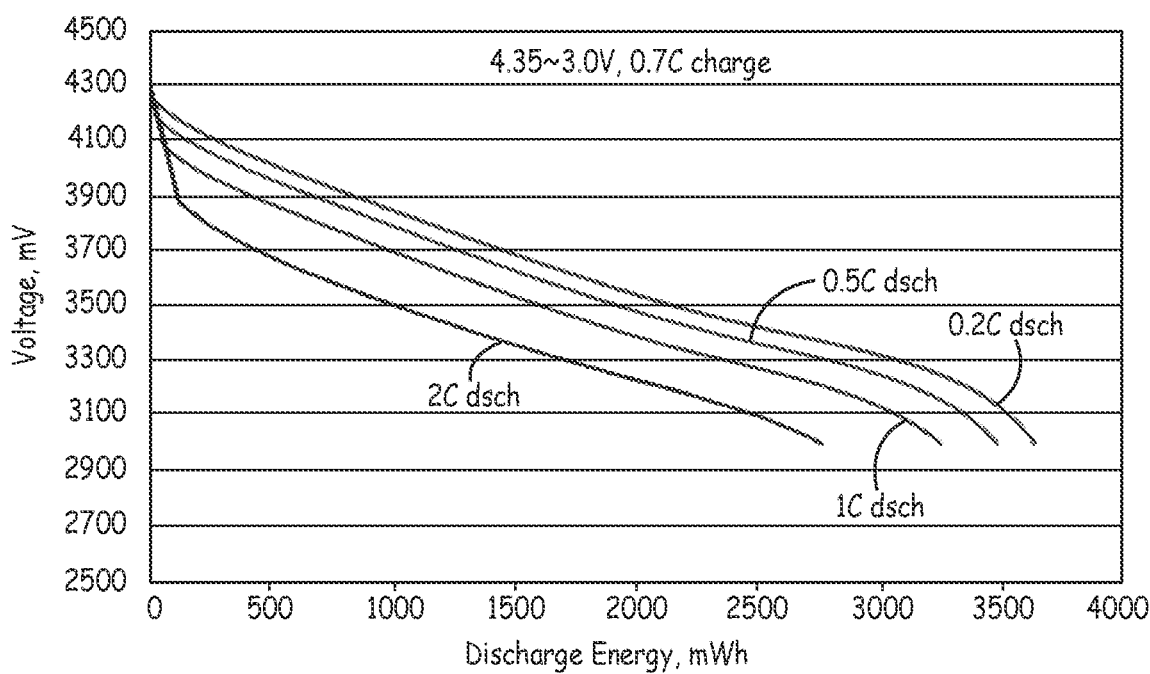
FIG. 9 is a plot voltage as a function of discharge energy for an embodiment of a high capacity pouch battery having spirally wound electrodes in a prismatic battery format at four discharge rates from 4.35 V to 3.0 V following a charge at 0.7 C after a formation cycle.
Figure 10:
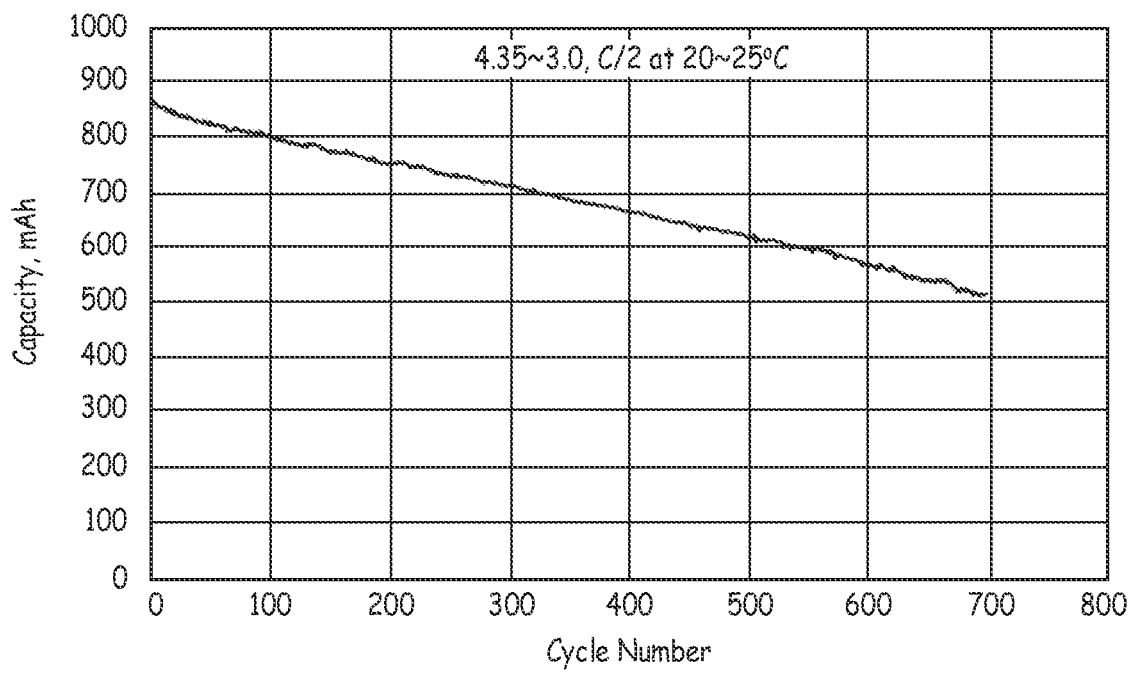
FIG. 10 is a plot of capacity as a function of cycle for the battery used to obtain FIG. 9 at a discharge rate of C/2 discharged from 4.35 V to 3.0 V.

Additional design parameters for battery 1 are shown in Table 7. After an initial formation cycle, battery 1 was discharged at 4 different rates from 4.35 V to 3 V to evaluate the rate capability. The discharge rate capability is plotted in FIG. 9. With respect to the corresponding volumetric energy density at the various rates, battery 1 exhibited the following: 669 Wh/l at C/5, 641 Wh/l at C/2, 598 Wh/l at 1 C and 508 Wh/l at 2 C. Battery 1 exhibit desirable cycling stability as demonstrated in FIG. 10 with capacity plotted as a function of cycle number.

TABLE 7

| | Anode | Cathode |
| --- | --- | --- |
| Loading (mg/cm$^2$) | 3.55 | 25.0 |
| Density (mg/cm$^3$) | | |
| Active percentage | 80% to 90% | 96% to 98% |
| Binder | 5% to 15% | 1% to 3.5% |
| Conductive Carbon | 5% to 15% | 0.5% to 3% |
| Specific first charge capacity (mAh/g) | 2150 | 177 |
| Formation N/P ratio | 150 | |
| Anode lithiation percentage | 30% | |

Figure 11:
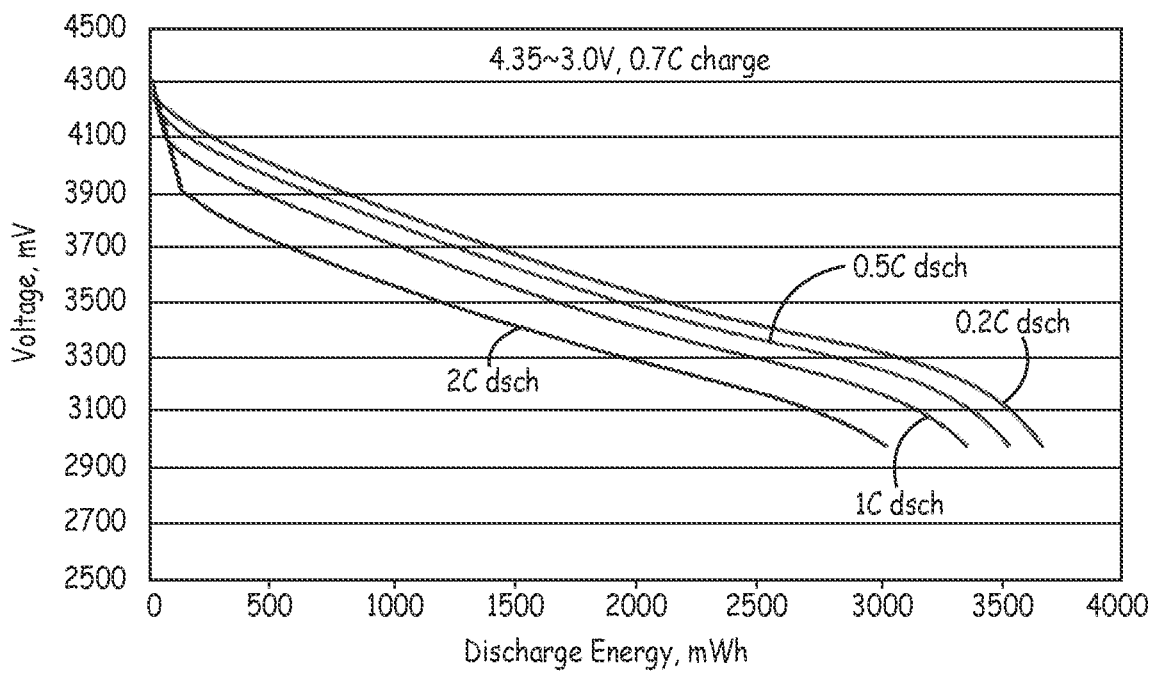
FIG. 11 is a plot of voltage as a function of discharge energy for another embodiment of a high capacity pouch battery having spirally wound electrodes in a prismatic battery format at four discharge rates from 4.35 V to 3.0 V following a 0.7 C charge after a formation cycle.
Figure 12:
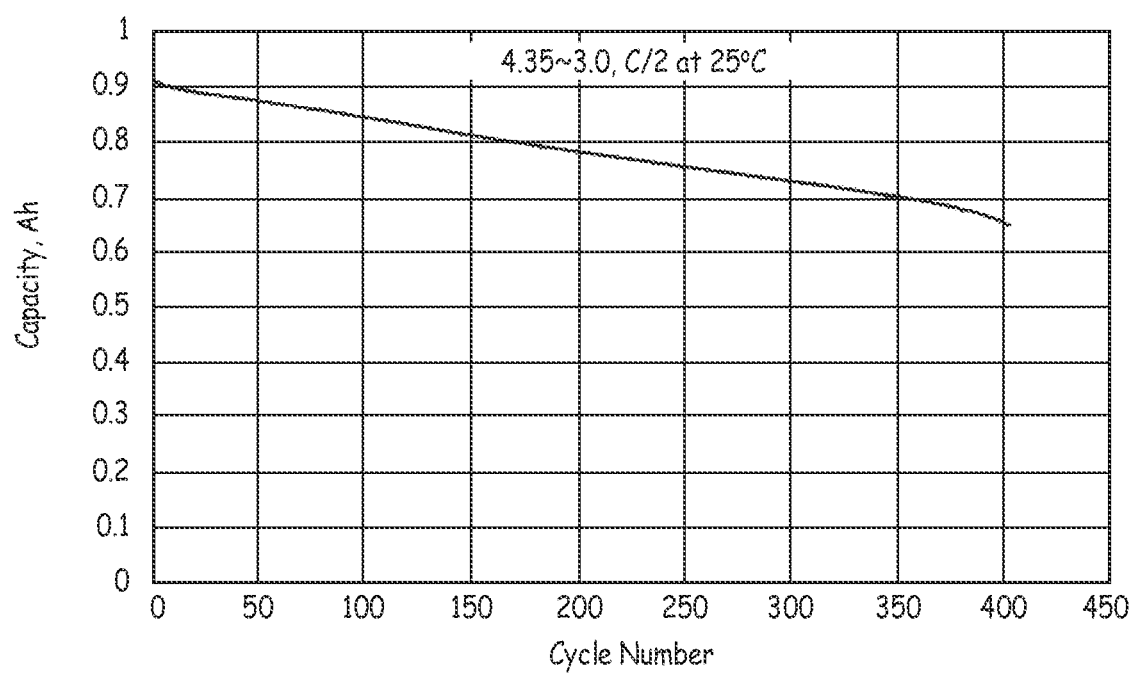
FIG. 12 is a plot of capacity as a function of cycle for the battery used to obtain FIG. 11 at a discharge rate of C/2 discharged from 4.35 V to 3.0 V.

Additional design parameters for battery 2 are shown in Table 8. After an initial formation cycle, battery 2 was discharged at 4 different rates from 4.35 V to 3 V to evaluate the rate capability. The discharge rate capability is plotted in FIG. 11. With respect to the corresponding volumetric energy density at the various rates, battery 2 exhibited the following: 657 Wh/l at C/5, 633 Wh/l at C/2, 602 Wh/l at 1 C and 543 Wh/l at 2 C. Battery 2 exhibited somewhat better rate capability relative to battery 1. Battery 2 exhibit desirable cycling stability as demonstrated in FIG. 12 with capacity plotted as a function of cycle number. Battery 2 exhibited slightly higher capacity at low numbers of cycles, but slightly worse cycling stability with respect to proportional capacity loss with cycling relative to battery 1.

TABLE 8

| | Anode | Cathode |
| --- | --- | --- |
| Loading (mg/cm$^2$) | 3.0 | 21.0 |
| Active percentage | 80% to 90% | 96% to 98% |
| Binder | 5% to 15% | 1% to 3.5% |
| Conductive Carbon | 5% to 15% | 0.5% to 3% |
| Specific first charge capacity (mAh/g) | 2150 | 177 |
| Formation N/P ratio | 151 | |
| Anode lithiation percentage | 30% | |

Example 4

Long Cycling for Stacked Electrode Batteries

This example demonstrated good cycling obtained with high capacity prismatic cells with stacked electrodes.

Figure 13:
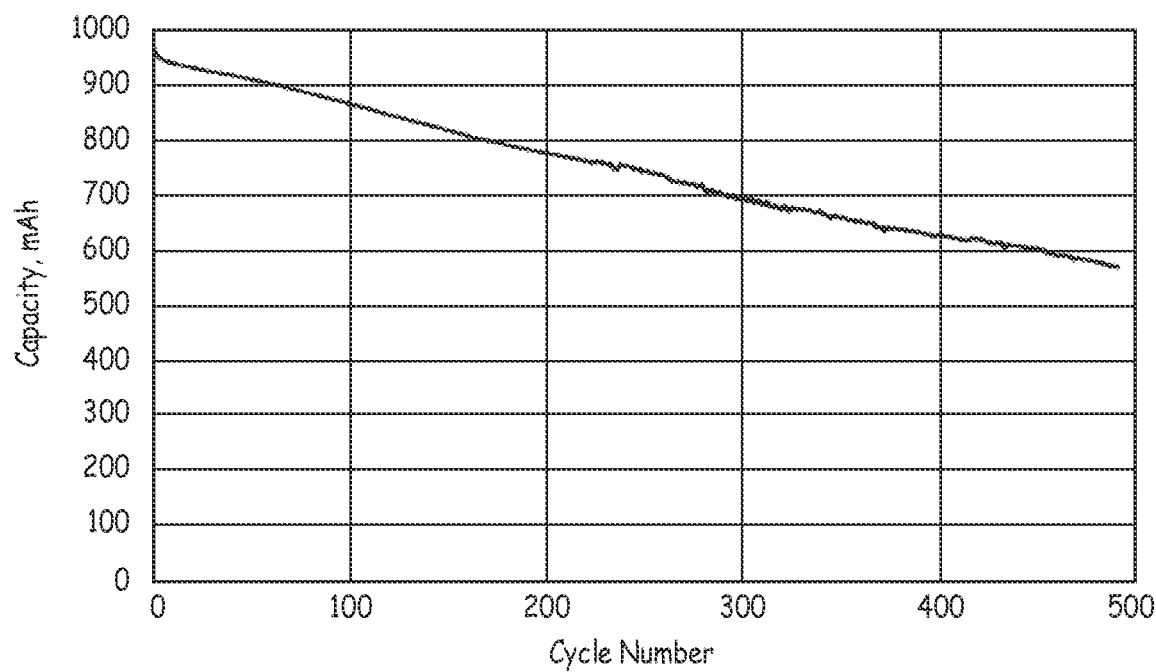
FIG. 13 is a plot of capacity as a function of cycle for a battery with stacked electrodes similar to the battery used to generate FIG. 3 except for additional layers, at a discharge rate of C/2 discharged from 4.35 V to 3 V.

A battery had stacked electrodes and were formed as described above and cycled without clamping. The battery has dimensions of 46.0 mm(L)*33.5 mm(W)*3.59 mm(T). Other particular design parameters of the second battery with stacked electrodes for this example are provided in Table 9. With respect to the rate dependence of the volumetric energy density of these batteries, the values were as follows: 714 at C/10 and 624 at C/3. These batteries were cycled for almost 500 cycles, and the cycling capacities are plotted in FIG. 13. The cycling results for these stacked electrode batteries were similar to the cycling results plotted in FIGS. 10 and 12 with the spirally wound electrodes. These improved battery design lead to roughly linear decay of capacity with cycling over a significant range.

TABLE 9

|  | Anode | Cathode |
|---|---|---|
| Loading (mg/cm2) | 3.45 | 25.0 (24.1 actual) |
| Active percentage | 85% | 97.7% |
| Specific first charge capacity (mAh/g) | 2150 | 177 |
| Formation N/P ratio |  | 145 |
| Anode lithiation percentage |  | 30% |

Example 5

Silicon-Based Material/Graphite Blends

This example demonstrates the performance of batteries that comprise a blend of graphite active material and a silicon based active material used in Examples 1-4.

Figure 14:
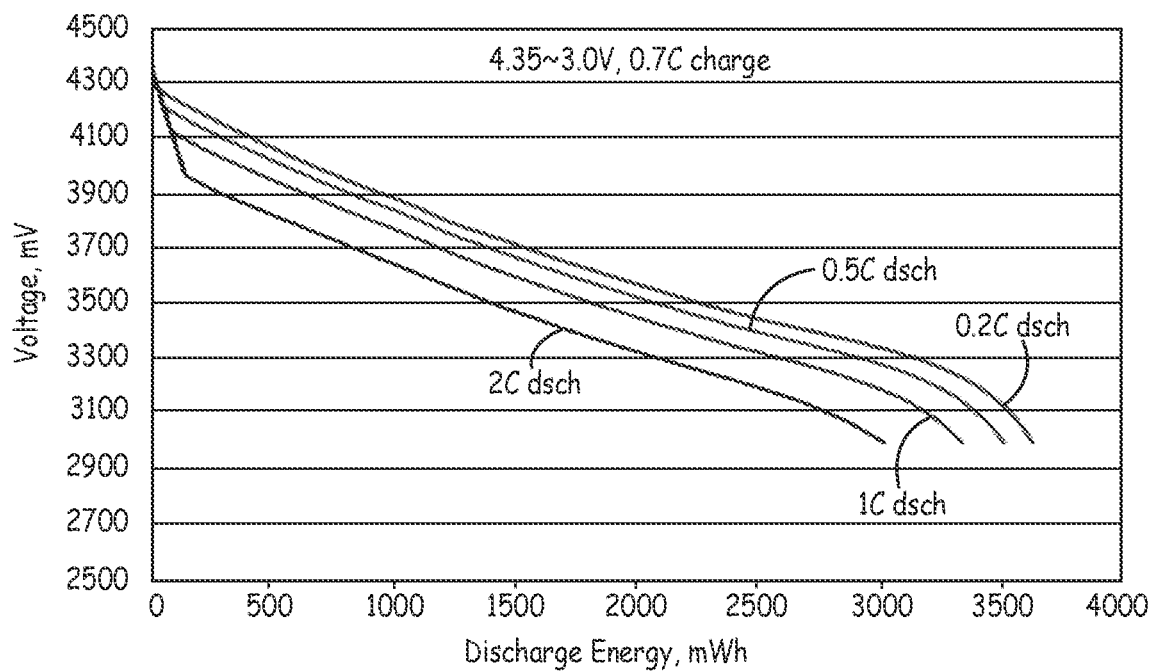
FIG. 14 is a plot of voltage as a function of discharge energy for an embodiment of a high capacity pouch battery have spirally wound electrodes and an anode with 25-35 weight percent graphitic carbon active material.
Figure 15:
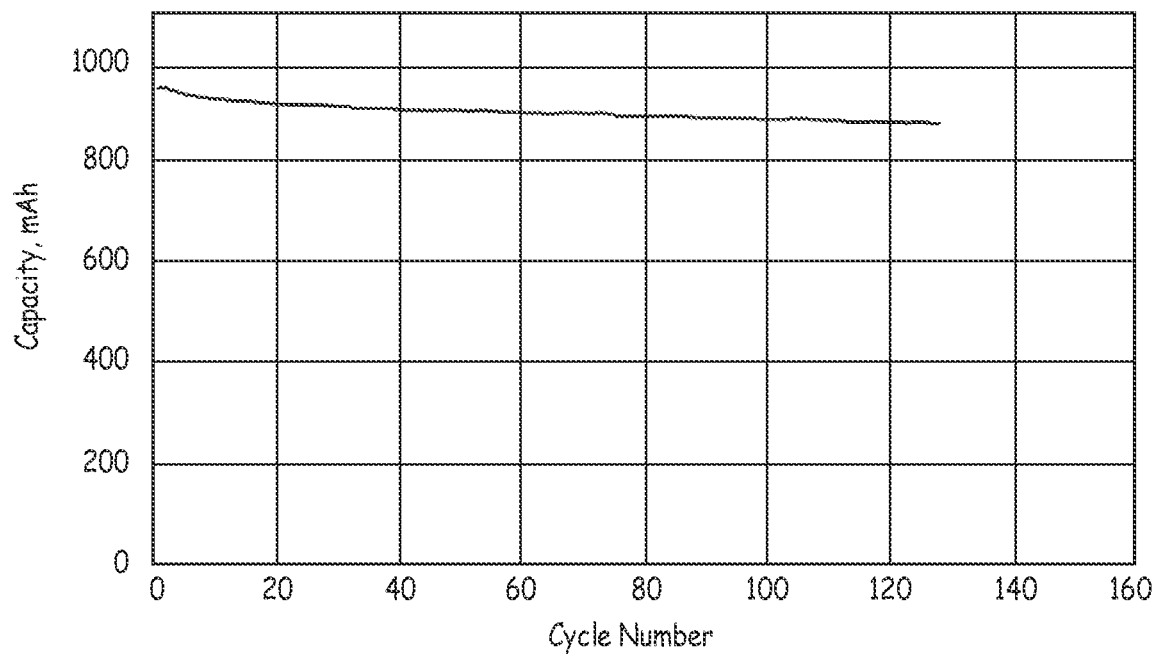
FIG. 15 is a plot of capacity as a function of cycle for a battery used to generate the plots of FIG. 14.

The batteries had spirally wound electrodes and were formed as described above. The batteries had dimensions of 36.0 mm(L)*21.1 mm(W) 7.6 mm(T). The active material comprises 25 to 35 wt % graphite with the remainder of the active material being commercial $SiO_x$—Si—C composite. Other specific design parameters are presented in Table 10. The batteries were tested for rate capability, and plots of voltage as a function of discharge energy are shown in FIG. 14. With respect to volumetric energy density as a function of rate, these batteries exhibited the following values, 626 Wh/l at C/5, 606 Wh/l at C/2, 570 at 1 C and 520 Wh/l at 2 C. The batteries were cycled, and a plot of cycling to 100 cycles is presented in FIG. 15. The batteries were expected to cycle similarly out to many additional cycles.

TABLE 10

|  | Anode (Si:Gr::7:3) | Cathode |
|---|---|---|
| Loading (mg/cm2) | 3.88 | 20.1 (20.5 actual) |
| Active percentage | 85% | 97.7% |
| Specific first charge capacity (mAh/g) | 1600 | 177 |
| Formation N/P ratio |  | 150 |
| Anode lithiation percentage |  | 30% |

The embodiments above are intended to be illustrative and not limiting. Additional embodiments are within the claims and inventive concepts. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A lithium ion battery having a volume from 500 mm³ to 100,000 mm³ and comprising a positive electrode comprising a lithium metal oxide, a negative electrode comprising a silicon based active material, a separator between the positive electrode and the negative electrode, supplemental lithium, and an electrolyte comprising lithium ions, wherein the supplemental lithium is present in an amount to compensate for 110% to 170% of the negative electrode first cycle irreversible capacity loss, wherein the electrodes are wound or in a stack of electrodes, wherein the silicon based active material generally has a specific capacity from 800 mAh/g to 2500 mAh/g at a rate of C/3 when cycled from 1.5 V to 0.005 V against lithium, wherein the negative electrode has an active material loading from 1.5 mg/cm² to 8 mg/cm² and a density from 0.5 g/cc to 2.0 g/cc, wherein the lithium ion battery has a balance of negative electrode capacity relative to the sum of positive electrode capacity and supplemental lithium from 0.8 to 1.5 and wherein the battery exhibits a volumetric energy density at least 550 Wh/l at a rate of C/10 discharged from 4.35 V to 2.75 V and wherein the lithium ion battery has a 150th cycle discharge capacity at a discharge rate of C/3 discharged from 4.35 V to 2.75 V that is at least 70% of the 5th cycle discharge capacity at a discharge rate of C/3 discharged from 4.35 V to 2.75 V.

2. The lithium ion battery of claim 1 wherein the lithium metal oxide comprises lithium cobalt oxide and the silicon based active material comprises a silicon suboxide-carbon composite.

3. The lithium ion battery of claim 1 wherein the silicon based active material generally has a specific capacity from 800 mAh/g to 2500 mAh/g at a rate of C/3 when cycled from 1.5 V to 0.005 V against lithium.

4. The lithium ion battery of claim 1 wherein the lithium ion battery has a balance of negative electrode capacity relative to the sum of positive electrode capacity and supplemental lithium from 0.95 to 1.4.

5. The lithium ion battery of claim 1 wherein the silicon based active material generally has a specific capacity from 950 mAh/g to 1800 mAh/g at a rate of C/3 when cycled from 1.5 V to 0.005 V against lithium.

6. The lithium ion battery of claim 1 wherein the battery exhibits a volumetric energy density at least 600 Wh/l at a rate of C/10 discharged from 4.35 V to 2.75 V.

7. The lithium ion battery of claim 6 wherein the lithium ion battery can have a 150th cycle discharge capacity at a discharge rate of C/3 discharged from 4.35 V to 2.75 V that is at least 70% of the 5th cycle discharge capacity at a discharge rate of C/3 discharged from 4.35 V to 2.75 V and wherein the electrolyte comprises from 6 wt % to 20 wt % fluoroethylene carbonate.

8. The lithium ion battery of claim 1 wherein the lithium ion battery has a prismatic shape and a wound positive electrode.

9. The lithium ion battery of claim 1 wherein the in the battery has a prismatic shape, a volume from 1000 mm³ to 50,000 mm³ and a stack with 7 to 16 layers of positive electrode.

10. A lithium ion battery comprising a positive electrode comprising lithium cobalt oxide, a negative electrode comprising a silicon based active material, a separator between the positive electrode and the negative electrode, supplemental lithium and an electrolyte comprising lithium ions, wherein the supplemental lithium is present in an amount to compensate for 110% to 170% of the negative electrode first cycle irreversible capacity loss, wherein the silicon based active material generally has a specific capacity from 800 mAh/g to 2500 mAh/g at a rate of C/3 when cycled from 1.5 V to 0.005 V against lithium, wherein the lithium ion battery has a balance of negative electrode capacity relative to the sum of positive electrode capacity and supplemental lithium from 1.1 to 1.7 and wherein the lithium ion battery has a 150th cycle discharge capacity at a discharge rate of C/3 discharged from 4.35 V to 2.75 V that is at least 80% of the 5th cycle discharge capacity at a discharge rate of C/3 discharged from 4.35 V to 2.75 V, and wherein the negative electrode has an active material loading from 1.5 mg/cm$^2$ to 8 mg/cm$^2$ wherein the battery exhibits a volumetric energy density at least 550 Wh/1;

wherein the lithium ion battery has a balance of negative electrode capacity relative to the sum of positive electrode capacity and supplemental lithium from 0.95 to 1.4, wherein the battery has a volume from 500 mm$^3$ to 100,000 mm$^3$, and wherein the battery exhibits a volumetric energy density at least 525 Wh/1 at a rate of C/10 discharged from 4.35 V to 2.75 V.

11. The lithium ion battery of claim 10 wherein the silicon based active material comprises a silicon suboxide-carbon composite.

12. The lithium ion battery of claim 10 wherein the silicon based active material generally has a specific capacity from 800 mAh/g to 2500 mAh/g at a rate of C/3 when cycled from 1.5 V to 0.005 V against lithium.

13. The lithium ion battery of claim 10 wherein the lithium ion battery has a 150th cycle discharge capacity at a discharge rate of C/3 discharged from 4.35 V to 2.75 V that is at least 85% of the 5th cycle discharge capacity at a discharge rate of C/3 discharged from 4.35 V to 2.75 V and wherein the negative electrode further comprises carbon nanotubes, carbon nanofibers or a combination thereof as an electrically conductive agent.

14. The lithium ion battery of claim 10 wherein the lithium ion battery can have a 400th cycle discharge capacity at a discharge rate of C/3 discharged from 4.35 V to 2.75 V that is at least 70% of the 5th cycle discharge capacity at a discharge rate of C/3 discharged from 4.35 V to 2.75 V.

15. The lithium ion battery of claim 10 wherein the positive electrode has a loading from 12 mg/cm$^2$ to 35 mg/cm$^2$ and a density of active material from 3.2 g/cc to 4.5 g/cc, and wherein the negative electrode has a loading from 2.5 mg/cm$^2$ to 7 mg/cm$^2$ and a density from 0.6 g/cc to 1.2 g/cc.

16. The lithium ion battery of claim 10 wherein the electrolyte comprises from 6 wt % to 20 wt % fluoroethylene carbonate.

17. The lithium ion battery of claim 10 wherein the negative electrode further comprise from 12 wt % to 70 wt % graphitic carbon active material relative to the total active material weight and wherein the lithium ion battery has a 300th cycle discharge capacity at a discharge rate of C/3 discharged from 4.35 V to 2.75 V that is at least 80% of the 5th cycle discharge capacity at a discharge rate of C/3 discharged from 4.35 V to 2.75 V.

18. The lithium ion battery of claim 1 wherein the electrodes are wound in a cylindrical shape.

* * * * *